(12) United States Patent
Edell

(10) Patent No.: US 10,719,492 B1
(45) Date of Patent: Jul. 21, 2020

(54) AUTOMATIC RECONCILIATION AND CONSOLIDATION OF DISPARATE REPOSITORIES

(71) Applicant: GrayMeta, Inc., Agoura Hills, CA (US)

(72) Inventor: Aaron Edell, Walnut Creek, CA (US)

(73) Assignee: GRAYMETA, INC., Agoura Hills, CA (US)

( * ) Notice: Subject to any disclaimer, the term of this patent is extended or adjusted under 35 U.S.C. 154(b) by 191 days.

(21) Appl. No.: 15/831,133

(22) Filed: Dec. 4, 2017

Related U.S. Application Data

(60) Provisional application No. 62/431,388, filed on Dec. 7, 2016.

(51) Int. Cl.
*G06F 16/21* (2019.01)
*G06F 16/215* (2019.01)
*G06F 16/248* (2019.01)
*G06F 16/2457* (2019.01)

(52) U.S. Cl.
CPC .......... *G06F 16/214* (2019.01); *G06F 16/215* (2019.01); *G06F 16/248* (2019.01); *G06F 16/24575* (2019.01)

(58) Field of Classification Search
CPC ................. G06F 16/214; G06F 16/248; G06F 16/24575; G06F 16/215
See application file for complete search history.

(56) References Cited

U.S. PATENT DOCUMENTS

| 5,873,085 A | 2/1999 | Enoki et al. |
| 5,897,638 A | 4/1999 | Lasser et al. |
| 6,356,863 B1 | 3/2002 | Sayle |
| 6,356,915 B1 | 3/2002 | Chtchetkine et al. |
| 6,381,615 B2 | 4/2002 | Gaither et al. |
| 6,895,591 B1 | 5/2005 | Russ et al. |
| 7,024,427 B2 | 4/2006 | Bobbitt et al. |
| 7,200,622 B2 | 4/2007 | Nakatani et al. |
| 7,296,041 B2 | 11/2007 | Nakatani et al. |
| 7,496,613 B2 | 2/2009 | Raghunath et al. |

(Continued)

FOREIGN PATENT DOCUMENTS

| EP | 0774723 A2 | 5/1997 |
| EP | 0840242 A2 | 5/1998 |

(Continued)

OTHER PUBLICATIONS

Viktor, Walkthrough: Exporting Data from Tables to CSV Files, pp. 1-6, Jun. 4, 2016.*

(Continued)

*Primary Examiner* — Albert M Phillips, III
(74) *Attorney, Agent, or Firm* — Wilson Sonsini Goodrich & Rosati

(57) ABSTRACT

The present application is directed to a network-enabled method and system for consolidating disparate repositories and for reconciling records into a common platform. In particular, the method and system in the present application can be used to automate the migration or importation of legacy repositories into newer schemaless repositories or metadata management platforms and to perform a comparison of data extracted from the legacy repository to data contained in the records residing on the metadata management platform.

18 Claims, 23 Drawing Sheets

(56) References Cited

U.S. PATENT DOCUMENTS

| | | |
|---|---|---|
| 7,644,136 B2 | 1/2010 | Rose et al. |
| 7,756,821 B2 | 7/2010 | Havens et al. |
| 7,831,578 B2 | 11/2010 | Chuang et al. |
| 7,908,476 B2 | 3/2011 | Kandasamy et al. |
| 8,001,086 B2 | 8/2011 | Raghunath et al. |
| 8,065,730 B1 | 11/2011 | Sobel et al. |
| 8,103,050 B2 | 1/2012 | Lefebvre et al. |
| 8,104,083 B1 | 1/2012 | Sobel et al. |
| 8,205,193 B2 | 6/2012 | Hertling et al. |
| 8,285,118 B2 | 10/2012 | Bronstein et al. |
| 8,358,840 B2 | 1/2013 | Bronstein et al. |
| 8,417,037 B2 | 4/2013 | Bronstein et al. |
| 8,434,016 B2 | 4/2013 | Butlin et al. |
| 8,442,384 B2 | 5/2013 | Bronstein et al. |
| 8,549,556 B2 | 10/2013 | Rakib et al. |
| 8,594,429 B2 | 11/2013 | Delorme et al. |
| 8,627,269 B2 | 1/2014 | Malasky et al. |
| 8,655,826 B1 | 2/2014 | Drewry et al. |
| 8,676,030 B2 | 3/2014 | Rakib et al. |
| 8,719,288 B2 | 5/2014 | Bronstein et al. |
| 8,731,235 B2 | 5/2014 | Boyd et al. |
| 8,732,220 B2 | 5/2014 | Do et al. |
| 8,793,274 B2 | 7/2014 | Yu et al. |
| 8,839,245 B1 | 9/2014 | Khajuria et al. |
| 8,863,297 B2 | 10/2014 | Sharma et al. |
| 8,863,298 B2 | 10/2014 | Akella et al. |
| 8,863,299 B2 | 10/2014 | Sharma et al. |
| 8,892,572 B2 | 11/2014 | Sanjeev |
| 8,990,270 B2 | 3/2015 | Uysal et al. |
| 9,100,245 B1 | 8/2015 | Andrews et al. |
| 9,122,706 B1 | 9/2015 | Holzschneider et al. |
| 9,135,270 B2 | 9/2015 | Goddard et al. |
| 9,213,858 B2 | 12/2015 | Sharma et al. |
| 9,311,375 B1 | 4/2016 | Naik |
| 9,401,972 B2 | 7/2016 | Yu et al. |
| 9,465,953 B2 | 10/2016 | Sharma et al. |
| 9,524,122 B2 | 12/2016 | Wade et al. |
| 2002/0112012 A1 | 8/2002 | Jones et al. |
| 2002/0188935 A1 | 12/2002 | Hertling et al. |
| 2003/0110188 A1 | 6/2003 | Howard et al. |
| 2003/0115218 A1 | 6/2003 | Bobbitt et al. |
| 2005/0114350 A1 | 5/2005 | Rose et al. |
| 2005/0210074 A1 | 9/2005 | Nakatani et al. |
| 2005/0273486 A1 | 12/2005 | Keith |
| 2006/0041527 A1 | 2/2006 | Fessler |
| 2006/0123010 A1 | 6/2006 | Landry et al. |
| 2006/0123062 A1 | 6/2006 | Bobbitt et al. |
| 2006/0173805 A1 | 8/2006 | Clifford et al. |
| 2006/0184540 A1 | 8/2006 | Kung et al. |
| 2006/0288034 A1 | 12/2006 | Do et al. |
| 2007/0162510 A1 | 7/2007 | Lenzmeier et al. |
| 2007/0260575 A1 | 11/2007 | Robinson et al. |
| 2007/0283280 A1 | 12/2007 | Butlin et al. |
| 2008/0126434 A1 | 5/2008 | Uysal et al. |
| 2008/0155214 A1 | 6/2008 | Shitomi |
| 2008/0165957 A1 | 7/2008 | Kandasamy et al. |
| 2008/0216009 A1 | 9/2008 | Drallos |
| 2009/0022472 A1 | 1/2009 | Bronstein et al. |
| 2009/0150879 A1 | 6/2009 | Raghunath et al. |
| 2009/0175538 A1 | 7/2009 | Bronstein et al. |
| 2009/0259633 A1 | 10/2009 | Bronstein et al. |
| 2010/0005488 A1 | 1/2010 | Rakib et al. |
| 2010/0008643 A1 | 1/2010 | Rakib et al. |
| 2010/0011392 A1 | 1/2010 | Bronstein et al. |
| 2010/0085481 A1 | 4/2010 | Winter et al. |
| 2010/0088317 A1 | 4/2010 | Bone et al. |
| 2010/0104184 A1 | 4/2010 | Bronstein et al. |
| 2010/0287201 A1 | 11/2010 | Damstra et al. |
| 2011/0035358 A1 | 2/2011 | Naik |
| 2011/0040812 A1 | 2/2011 | Phillips |
| 2011/0188704 A1 | 8/2011 | Radhakrishnan et al. |
| 2011/0246471 A1 | 10/2011 | Rakib |
| 2011/0252071 A1 | 10/2011 | Cidon |
| 2011/0289114 A1 | 11/2011 | Yu et al. |
| 2011/0289532 A1 | 11/2011 | Yu et al. |
| 2011/0296452 A1 | 12/2011 | Yu et al. |
| 2012/0030264 A1 | 2/2012 | Horn |
| 2012/0110043 A1* | 5/2012 | Cavet ............... G06F 16/70 707/825 |
| 2012/0124638 A1 | 5/2012 | King et al. |
| 2012/0143929 A1 | 6/2012 | Baratakke et al. |
| 2013/0006951 A1 | 1/2013 | Yu et al. |
| 2013/0013583 A1 | 1/2013 | Yu et al. |
| 2013/0167104 A1 | 6/2013 | Malasky et al. |
| 2013/0219176 A1 | 8/2013 | Akella et al. |
| 2013/0219456 A1 | 8/2013 | Sharma et al. |
| 2013/0247036 A1 | 9/2013 | Fujiwara |
| 2013/0263207 A1 | 10/2013 | Granstrom |
| 2013/0297662 A1 | 11/2013 | Sharma et al. |
| 2014/0082051 A1 | 3/2014 | Yu et al. |
| 2014/0136578 A1 | 5/2014 | Wood et al. |
| 2014/0140682 A1 | 5/2014 | Wang et al. |
| 2014/0250450 A1 | 9/2014 | Yu et al. |
| 2014/0324845 A1 | 10/2014 | Bronstein et al. |
| 2014/0369551 A1 | 12/2014 | Liang et al. |
| 2015/0019614 A1 | 1/2015 | Pierre-March |
| 2015/0046537 A1 | 2/2015 | Rakib |
| 2015/0052125 A1* | 2/2015 | Ellis ............... G06F 16/24578 707/724 |
| 2015/0058998 A1 | 2/2015 | Yu et al. |
| 2015/0095972 A1 | 4/2015 | Sharma et al. |
| 2015/0235047 A1 | 8/2015 | Lenzmeier et al. |
| 2015/0237410 A1 | 8/2015 | Yu et al. |
| 2015/0254342 A1 | 9/2015 | Yu et al. |
| 2015/0254343 A1 | 9/2015 | Yu et al. |
| 2015/0302886 A1 | 10/2015 | Brock et al. |
| 2015/0324219 A1 | 11/2015 | Fitzgerald et al. |
| 2015/0379039 A1 | 12/2015 | Chandrasekaran et al. |
| 2015/0381671 A1 | 12/2015 | Lee et al. |
| 2016/0063272 A1 | 3/2016 | Sharma et al. |
| 2016/0246816 A1 | 8/2016 | Abiri et al. |
| 2016/0275101 A1 | 9/2016 | Hinterbichler et al. |
| 2016/0292080 A1 | 10/2016 | Leidel et al. |
| 2017/0004131 A1 | 1/2017 | Ben Dayan et al. |
| 2018/0210901 A1 | 7/2018 | Depaoli et al. |

FOREIGN PATENT DOCUMENTS

| | | |
|---|---|---|
| EP | 0774723 A3 | 7/1998 |
| EP | 0840242 A3 | 3/2002 |
| EP | 1267259 A2 | 12/2002 |
| EP | 1267259 A3 | 5/2004 |
| JP | H02257340 A | 10/1990 |
| JP | H05216938 A | 8/1993 |
| JP | H0749805 A | 2/1995 |
| JP | H103421 A | 1/1998 |
| JP | 2000513857 A | 10/2000 |
| JP | 2001051890 A | 2/2001 |
| JP | 2002524793 A | 8/2002 |
| JP | 2004288129 A | 10/2004 |
| JP | 2007513429 A | 5/2007 |
| JP | 2007535025 A | 11/2007 |
| JP | 2008547074 A | 12/2008 |
| JP | 2009053995 A | 3/2009 |
| JP | 2012168906 A | 9/2012 |
| JP | 2014174870 A | 9/2014 |
| WO | WO-9858331 A1 | 12/1998 |
| WO | WO-0014632 A1 | 3/2000 |
| WO | WO-2005057343 A2 | 6/2005 |
| WO | WO-2005081132 A1 | 9/2005 |
| WO | WO-2005119495 A2 | 12/2005 |
| WO | WO-2006134023 A1 | 12/2006 |
| WO | WO-2009035764 A2 | 3/2009 |
| WO | WO-2005119495 A3 | 4/2009 |
| WO | WO-2009035764 A3 | 8/2009 |
| WO | WO-2009129243 A1 | 10/2009 |
| WO | WO-2009129328 A1 | 10/2009 |
| WO | WO-2009146180 A2 | 12/2009 |
| WO | WO-2011022388 A1 | 2/2011 |
| WO | WO-2014078445 A1 | 5/2014 |
| WO | WO-2016018446 A1 | 2/2016 |
| WO | WO-2016161251 A1 | 10/2016 |

(56) References Cited

FOREIGN PATENT DOCUMENTS

OTHER PUBLICATIONS

Bronstein, et al. The Video Genome. BBK Technologies Ltd. Submitted Mar. 27, 2010. Published Mar. 30, 2010. arXiv:1003.5320v1. 18 pages.
Co-pending U.S. Appl. No. 15/413,365, filed Jan. 23, 2017, 48 pages.
Co-pending U.S. Appl. No. 15/469,375, filed Mar. 24, 2017, 55 pages.
Co-pending U.S. Appl. No. 16/409,632, filed May 10, 2019, 53 pages.
U.S. Appl. No. 15/413,365 Notice of Allowance dated Jan. 28, 2019, 7 pages.
U.S. Appl. No. 15/413,365 Office Action dated Jun. 20, 2018, 17 pages.
U.S. Appl. No. 15/469,375 Office Action dated Sep. 11, 2019, 28 pages.
U.S. Appl. No. 15/469,375 Office Action dated May 20, 2020. 32 pages.
U.S. Appl. No. 16/409,632 Office Action dated Mar. 30, 2020. 25 pages.

\* cited by examiner

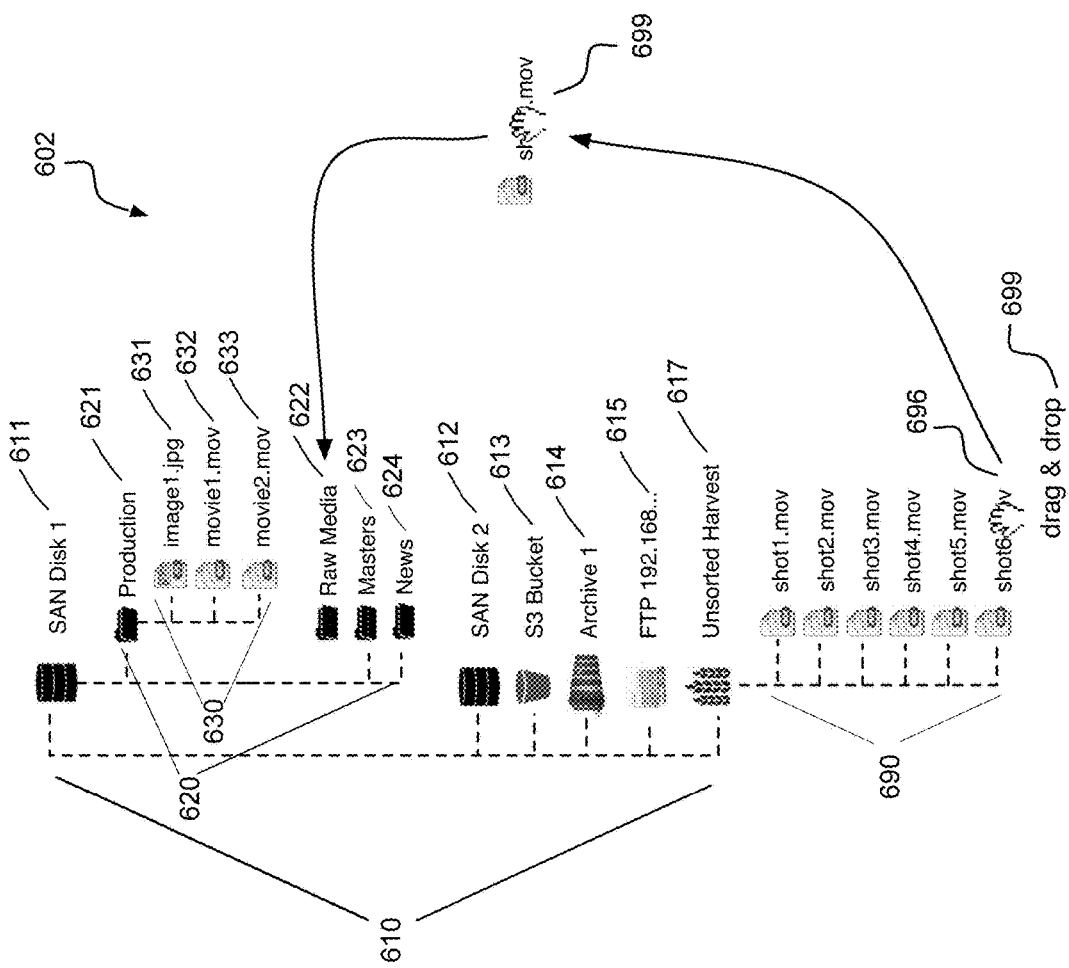

Legacy Database

| FileName | Date | Photographer | Producer | Tags | Notes |
|---|---|---|---|---|---|
| img_dsc001 | 01/01/03 | Melanie C. | Arthur A. | Sunset, trees | |
| img_dsc002 | 01/01/03 | Melanie C. | Arthur A. | Park, hotel | |
| img_dsc003 | 05/06/12 | John F. | Coop B. | House, cars, people | |
| img_dscB22 | 11/10/14 | Stacey D. | Marla M. | coffee, Pepsi | |
| img_dsc3d3ff | 10/01/04 | Richard C. | Duke A. | Elsworth, Church | |
| img_03-04-5 | 03/04/03 | Bruce W. | Clark K. | Gotham bank | |
| img_dsc001 | 01/01/03 | Melanie C. | Arthur A. | BMW, Milan | |

FIG. 12A

AUTOMATIC RECONCILIATION AND CONSOLIDATION OF DISPARATE REPOSITORIES

CROSS-REFERENCE

This application claims the benefit of U.S. Provisional Application No. 62/431,388, filed Dec. 7, 2016, which application is incorporated entirely herein by reference.

BACKGROUND OF THE INVENTION

1. Field of the Invention

The present application relates to the field of digital content access and management and in particular, to a method and system for automatically reconciling and consolidating disparate repositories (e.g., databases). In particular, the system and method described herein provides the ability to migrate or import disparate databases such as legacy databases into metadata management platforms or management systems having a structure different from or incompatible with the imported databases.

2. Description of Background Art

Digital content describes any file or set of data present on any digital system. Digital content can be any of a variety of digital media, including but not limited to voice (i.e. speech), music, video, audio, two-dimensional still images, two-dimensional moving images, including film and video, text in various formats including documents, emails, subtitles, and scripts, existing databases and the like. Additionally, a file-based digital source, asset, or file may be obtained from any digital source as known in the art or yet to be developed, and may exist in any digital container, domain, system, or other environment.

The files, data sets, or file-based assets discussed above may exist in a file system in a file-based environment, where the file system comprises various file components. The file components may include the files or data sets themselves as well as various structures to contain, catalog, and/or organize the files or data sets. A file system may comprise single or multiple files or data sets contained in various folder or directory structures. A folder contained inside another folder is called a subfolder. Similarly, a directory contained inside another directory is called a subdirectory. A folder or directory structure may comprise a folder, subfolder, directory, or subdirectory. Files may be organized by storing related files in the same directory. Subfolders or subdirectories may be organized by storing related subfolders in the same folder and related subdirectories in the same directory.

The terms parent and child may be used to describe the relationship between a subdirectory and the directory in which it is contained or cataloged. A relationship may also exist among files contained in the same folder or directory structure, subfolders contained in the same folder, or subdirectories contained in the same directory. Files and folders or directories may be organized in a hierarchical manner, with a top-most directory (i.e. the root directory, which has no parent) at the top of the hierarchy.

A user may wish to search for or access specific digital content, a specific file or set of files, or a specific folder or directory structure. A user may also wish to modify a file system or any of its constituent file components including how the file system is cataloged, organized, or configured. For example, a user may wish to create, move, or remove a file or set of files from any one or more of the various folder or directory structures, or create, move, or remove any one or more of the various folder or directory structures.

Multiple data storage systems of various sizes may exist in various different systems or locations, each having its own file system, file components, and file system hierarchy or configuration.

The files, data sets, or file-based assets discussed above may also have associated metadata. Metadata is data about data. Metadata may describe details about a set of data such as a file or data stream. Metadata often includes information such as where the data came from (e.g. original file system location, permissions, linkage, etc.), when it was created, how the data is formatted, who touched or accessed the data, who created the data etc.

There are numerous algorithms that can be used for extracting and generating metadata from data sources. Many of these algorithms are in the public domain available on the Internet at various universities, commercial and even personal Web sites. Many of these algorithms or tools are proprietary. The following are representative examples of algorithms that relate to moving image files such as films and video: a) speech to text algorithms; b) optical character recognition (OCR) or text recognition algorithms; c) face detection algorithms; d) object recognition algorithms; e) picture, frame, and audio similarity algorithms.

There are a variety of known standards for metadata sets as they relate to different data sources. This metadata, sometimes embedded with the data source or file can include information such as: a) frame size, b) length or duration of content, c) format of data content, e) name of data source, and f) context of data source (i.e. permissions).

There are systems that extract or harvest all of this metadata from a given set of data sources, and store them in a data store. These data stores maintain all the metadata for a given file, including the original location and context for the file.

One problem that arises for digital content users seeking to access, manage, or modify files, data sets, and file-based assets is the inability, from one centralized system, location, or interface, to view or access files disposed in multiple, sometimes very large, data storage systems existing in various different systems or locations, each having its own file system, file components, and file system hierarchy or configuration. In particular, digital content users lack the ability, from one centralized system, location, or interface, to search or browse (or set permissions for other users to search or browse) specific digital content, a specific file or set of files, or a specific folder or directory structure in the file system of at least one of the multiple data storage systems existing in various different systems or locations. Digital content users also lack the ability, from one centralized system, location, or interface, to manage or modify (or set permissions for other users to manage or modify) a particular file system of at least one of the multiple data storage systems existing in various different systems or locations. In particular, digital content users lack the ability to manage or modify the various file components of a file system and how the file system is cataloged, organized, or configured (i.e. by creating, moving, or removing a file or set of files from any one or more of the various folder or directory structures, or by creating, moving, or removing any one or more of the various folder or directory structures in the file system).

Another problem faced by digital content users seeking to access, manage, or modify files from one centralized system, location, or interface is the lack of a tool to view or visualize files, their file systems, and associated metadata. Also lacking is an ability to customize a user's view or visualization of files disposed in multiple, sometimes very large, data storage systems existing in various different systems or locations, each having its own file system, file components, and file system hierarchy or configuration. For example, digital content users lack the ability, from one centralized system, location, or interface, to select or filter specific digital content, a specific file or set of files, or a specific folder or directory structure in the file system of at least one of the multiple data storage systems existing in various different systems or locations in order to customize their view of the digital content.

In addition, the digital content, files, data sets, and file-based assets discussed above may exist in disparate or different types of databases having or relying on different structures that may make them incompatible with other databases that do not share the same structure. With respect to accessing data contained in these disparate databases, platforms or systems having and/or processing records based on files, data sets, and file-based assets may be unable to incorporate the metadata or data that may exist for the files, data sets, and file-based assets contained in such databases, forcing users to either manually enter or import metadata on a per asset basis. For example, the files and data sets can exist in legacy database systems, which can often rely on or incorporate a structure based on tables with rows and columns. Given the various dissimilarities between file formats and databases, it would be advantageous to provide an automatic system and method that allows a user to migrate or import legacy databases into newer schemaless databases or metadata management platforms such as, for example, the metadata platform disclosed and described in co-pending U.S. patent application Ser. No. 15/413,365 and U.S. patent application Ser. No. 15/469,375, the entire contents of which are incorporated herein by reference.

What is needed to address these specific technical problems related to digital content access, management, and visualization is a method and system that can use metadata that has been generated (and may therefore be readily available) to create a representation of the original file system and its corresponding file structure—i.e. a virtual file system. Using such a virtual file system, digital content users may, from one centralized system, location, or interface, access, view, search, browse, visualize, filter and even modify (given the proper permissions) specific digital content, file components, component relationships, and file system configurations for files disposed in multiple data storage systems existing in various different systems or locations.

Moreover, it would be advantageous to provide a computer-implemented method and system that can automatically reconcile and consolidate disparate databases and that can enable data processing and data management based on or using the metadata contained in such databases. In particular, one advantage of such a method and system is in enabling a user to migrate or import legacy databases into newer schemaless databases or metadata management platforms even where such platforms have or rely on a database structure or file format that differs from the structure or file format used in the legacy databases.

SUMMARY OF THE INVENTION

According to one or more embodiments, a file asset management method and system using an automated file asset management agent may be used to extract, harvest, and store metadata from files in an original file system in any given file-based environment. The automated file asset management agent may access, process, and analyze the stored metadata to generate a virtual file system, which may be accessed by a digital content user through an interface. The file asset management method and system may be used to preserve the context of any relationships between or among constituent file components in the original file system and the file component relationships themselves in the virtual file system.

In accordance with aspects of the invention, a network-enabled method for consolidating disparate repositories onto a common media asset management platform may be provided. The method may comprise: receiving a communication comprising data extracted from a first repository of media players on a network of devices for comparison to data in each of a plurality of records in the media asset management platform; determining whether a selected entry of the extracted data matches an entry in each of the plurality of records; identifying a set of entries in the plurality of records determined to match the selected entry of the extracted data; and translating the first repository with the plurality of records by incorporating the extracted data in one of the plurality of records or in a newly generated record to be stored in the media asset management platform and accessible for playback on the media player on a device from the network of devices.

In some embodiments, the method may further comprise providing a graphical interface for displaying the extracted data, the results of the data comparison, and the identified set of matching entries. Optionally, the method may further comprise: providing the first repository as a common repository output file, wherein the first repository is a legacy repository; importing the legacy repository into the media asset management platform; and extracting data from the common repository output file for comparison to data in each of the plurality of records. Providing a legacy repository may further comprise exporting the legacy repository as a common repository output file comprising a plurality of cells, wherein each record in the plurality of records comprises a plurality of fields, and wherein each field in the plurality of fields has an associated value. The format of the data in each of the plurality of records may be different from the format of the data in the common repository output file and wherein identifying the set of matching entries comprises identifying text from each cell in the plurality of cells in the common repository output file and comparing the identified text to each value in each field of each record in the media asset management system to find a match. In some instances, consolidating the first repository with the plurality of records may occur in response to at least one of: determining whether a selected entry of the extracted data matches an entry in each of the plurality of records and identifying a set of entries in the plurality of records determined to match the selected entry of the extracted data.

In some embodiments, the extracted data from the first repository comprises labels and values associated with the labels, wherein the selected entry of the extracted data is a selected label, and wherein determining whether a selected entry of the extracted data matches an entry in each of the plurality of records comprises matching the selected label of the extracted data with a pre-existing label in one of the plurality of records. The method may further comprise, in response to the identification of the set of matching entries in the plurality of records, providing an option to select one of the pre-existing labels in one of the plurality of records or to select a different pre-existing label in one of the plurality of records, wherein the different pre-existing label was not determined to match the selected entry of the extracted data. Optionally, the method may further comprise, in response to a selection of a pre-existing label, consolidating the first repository with the plurality of records by incorporating the extracted data into one of the plurality of records. The method may further comprise providing a graphical interface for selecting one of the pre-existing labels in one of the plurality of records or a different pre-existing label in one of the plurality of records and for displaying the results of the selection.

Additional aspects of the invention may be directed to a network-enabled system for consolidating disparate repositories onto a common media asset management platform, comprising: a communication module for receiving a communication comprising data extracted from a first repository of media players on a network of devices for comparison to data in each of a plurality of records in the media asset management platform; and a translation module configured to (i) determine whether a selected entry of the extracted data matches an entry in each of the plurality of records, (ii) identify a set of entries in the plurality of records determined to match the selected entry of the extracted data, and (iii) translate the first repository with the plurality of records by incorporating the extracted data in one of the plurality of records or in a newly generated record to be stored in the media asset management platform and accessible for playback on the media player on a device from the network on a device from the network of devices.

In some embodiments, the system may further comprise a graphical interface for displaying the extracted data, the results of the data comparison, and the identified set of matching entries. The system may further comprise an extraction module for: importing the first repository, wherein the first repository is a legacy repository that has been exported as a common repository output file; and extracting data from the common repository output file for comparison to data in each of the plurality of records. Optionally, the common repository output file may comprise a plurality of cells, wherein each record in the plurality of records comprises a plurality of fields, and wherein each field in the plurality of fields has an associated value. The format of the data in each of the plurality of records may be different from the format of the data in the common repository output file, and wherein the instructions for identifying the set of matching entries comprise instructions for identifying text from each cell in the plurality of cells in the common repository output file and instructions for comparing the identified text to each value in each field of each record in the media asset management system to find a match. The translation of the first repository with the plurality of records may comprise at least one of: determining whether a selected entry of the extracted data matches an entry in each of the plurality of records and identifying a set of entries in the plurality of records determined to match the selected entry of the extracted data.

The translation module may further match a selected label of the extracted data with a pre-existing label in one of the plurality of records, wherein the extracted data from the first repository comprises labels and values associated with the labels. The translation module may further provide an option to select a pre-existing label residing in at least one of the plurality of records, the pre-existing label having been determined to match the selected label of the extracted data or to select a different pre-existing label in one of the plurality of records, wherein the different pre-existing label was not determined to match the selected entry of the extracted data. The translation module may translate the first repository with the plurality of records by incorporating the extracted data into one of the plurality of records in response to the selection of a pre-existing label. The system may further comprise an interactive graphical interface configured to display a set of pre-existing labels having been determined to match the selected label of the extracted data and to provide an option to select one of the set of pre-existing labels or a different pre-existing label in one of the plurality of records, wherein the different pre-existing label was not determined to match the selected entry of the extracted data.

In an additional aspect, a method for providing centralized access, management, and customized visualization of digital content using an automated file asset management agent comprises providing one or more selected files and extracting metadata from the one or more selected files by engaging one or more extraction engines. At least one of the one or more selected files has an original file system structure comprising at least one or more file components and associated file component relationships. The method further comprises harvesting the extracted metadata from the one or more selected files, wherein the harvested metadata comprises metadata related to the original file system structure of the at least one of the one or more selected files having an original file system structure, and storing the metadata harvested from the one or more selected files in a data store. An automated file asset management agent is provided that interfaces with the data store. The automated file asset management agent independently performs the steps of: (1) accessing the harvested metadata from the one or more selected files from the data store; (2) processing the accessed metadata from the one or more selected files, and (3) generating a virtual file system using the processed metadata from the one or more selected files to recreate the original file system structure of the at least one of the one or more selected files having an original file system structure. The virtual file system may further comprise interactable virtual file components corresponding to the at least one or more file components of the original file system structure. A graphical interface for interacting with the interactable virtual file components is provided that allows a user to access, manage, or modify the one or more selected files, the original file system structure of the at least one of the one or more selected files, and the at least one or more file components and associated file component relationships of the at least one of the one or more selected files.

In a preferable embodiment, a file system may be comprised of file components including but not limited to multiple files, folders or directories, and folder or directory structures. The relationships between and among the file components may be maintained in a data store alongside all of the other harvested metadata for any particular file. A virtual file system may be generated and organized by the aforementioned file component relationships to mirror or recreate the original file system and its constituent components. A user may then browse the recreated or virtual file system through an interface as if he or she were browsing the original file system from which the files in question originated and which may still exist.

In another embodiment, a file asset management method and system may be used to generate a recreated or virtual file system from an original file system using metadata harvested from file components existing in the original file system. A user may search the recreated or virtual file system for specific content based on metadata, data, or any combination of either or both, for a specific subset of files, folders or directories, and/or folder or directory structures. The results are obtained through an interface of the file asset management system, and may be displayed with the option of visualizing all of the other metadata and data harvested by the file asset management system.

In further aspects, a computer-implemented method for consolidating disparate databases is provided. The method comprises comparing data extracted from a first database to data in each of a plurality of records in a file asset management system or platform and determining whether a selected entry of the extracted data matches an entry in each of the plurality of records. The method further comprises identifying a set of entries in the plurality of records determined to match the selected entry of the extracted data and consolidating the first database with the plurality of records by incorporating the extracted data in one of the plurality of records or in a newly generated record. A graphical interface can be provided for displaying the extracted data, the results of the data comparison, and the identified set of matching entries.

In a preferable embodiment, the first database, which can be a legacy database or any other database that may or may not share a common format with the records in the file asset management system or platform, can be provided as a common database output file or any other output file as known in the art. The method can comprise importing the legacy database or the output file into the file asset management system or platform and extracting data from the legacy database or output file for comparison to data in each record in the plurality of records.

In some embodiments, the method can comprise exporting the legacy database as a common database output file comprising a plurality of cells. Moreover, each record in the plurality of records can comprise a plurality of fields, and each field in the plurality of fields can have an associated value. The format of the data in each of the plurality of records can be different from the format of the data in the common database output file. In addition, identifying the set of matching entries can comprise identifying text from each cell in the plurality of cells in the common database output file and comparing the identified text to each value in each field of each record in the file asset management system to find a match.

The method can further comprise consolidating the first database with the plurality of records in the file asset management system or platform in response to at least one of: determining whether a selected entry of the extracted data matches an entry in each of the plurality of records and identifying a set of entries in the plurality of records determined to match the selected entry of the extracted data. The extracted data from the first database can comprise categories, headers, or labels and values or data associated with the categories, headers, or labels. In a preferable embodiment, the selected entry of the extracted data can be a selected category, header, or label, and determining whether a selected entry of the extracted data matches an entry in each of the plurality of records can comprise matching the selected category, header, or label of the extracted data with a pre-existing category, header, or label in one of the plurality of records.

In some embodiments, the method can comprise providing an option to select one of the pre-existing categories, headers, or labels in one of the plurality of records or to select a different pre-existing category, header, or label in one of the plurality of records, wherein the different pre-existing category, header, or label was not determined to match the selected entry of the extracted data. The option to select a pre-existing category, header, or label can be provided based on or in response to the identification of the set of matching entries in the plurality of records.

The method can comprise, based on or in response to the selection of a pre-existing category, header, or label, consolidating the first database with the plurality of records by incorporating the extracted data into one of the plurality of records. Finally, a graphical interface can be provided for selecting one of the pre-existing categories, headers, or labels in one of the plurality of records or a different pre-existing category, header, or label in one of the plurality of records and for displaying the results of the selection.

In yet another aspect, a computer-implemented system for consolidating disparate databases comprises a digital processing device that can comprise at least one processor, an operating system configured to perform executable instructions, a memory comprising storage for housing a plurality of records, and a computer program including instructions executable by the digital processing device. In particular, the executable instructions can comprise instructions for: comparing data extracted from a first database to data in each of a plurality of records; determining whether a selected entry of the extracted data matches an entry in each of the plurality of records; identifying a set of entries in the plurality of records determined to match the selected entry of the extracted data; and consolidating the first database with the plurality of records by incorporating the extracted data in one of the plurality of records or in a newly generated record. The newly generated record may be added to the plurality of records. The plurality of records may be housed in memory or on a storage device. The memory or storage device may reside on the file asset management system or platform, on some other common platform, or in a separate location distinct from the platform. A graphical interface can be provided for displaying the extracted data, the results of the data comparison, and the identified set of matching entries.

The instructions executable by the digital processing device can comprise instructions for: importing the first database, wherein the first database is a legacy database that has been exported as a common database output file, and for extracting data from the common database output file for comparison to data in each of the plurality of records. The common database output file can comprise a plurality of cells and each record in the plurality of records can comprise a plurality of fields, wherein each field in the plurality of fields can have an associated value.

The format of the data in each of the plurality of records can be different from the format of the data in the common database output file. In addition, the instructions for identifying the set of matching entries can comprise instructions for identifying or recognizing text from each cell in the plurality of cells in the common database output file and for comparing the identified or recognized text to each value in each field of each record in the file asset management system or platform to find a match.

The instructions for consolidating the first database with the plurality of records can further comprise instructions in response to at least one of: determining whether a selected entry of the extracted data matches an entry in each of the plurality of records and identifying a set of entries in the plurality of records determined to match the selected entry of the extracted data. The executable instructions can also comprise instructions for matching a selected category, header, or label of the extracted data with a pre-existing category, header, or label in or associated with one of the plurality of records, wherein the extracted data from the first database comprises categories, headers, or labels and values or data associated with each category, header, or label.

The instructions executable by the digital processing device can comprise instructions that provide an option to select a pre-existing category, header, or label residing in at least one of the plurality of records, the pre-existing category, header, or label having been determined to match the selected category, header, or label of the extracted data or to select a different pre-existing category, header, or label in one of the plurality of records, wherein the different pre-existing category, header, or label was not determined to match the selected entry of the extracted data Additionally, the executable instructions can comprise instructions for consolidating the first database with the plurality of records by incorporating the extracted data into one of the plurality of records in response to the selected option. In particular, the executable instructions can comprise instructions for consolidating the first database with the plurality of records by incorporating the extracted data into one of the plurality of records based on or in response to the selection of a pre-existing category, header, or label.

Finally, an interactive graphical interface can be provided for selecting one of the pre-existing categories, headers, or labels in one of the plurality of records or a different pre-existing category, header, or label in one of the plurality of records and for displaying the results of the selection. In particular, the interactive graphical interface can be configured to display a set of pre-existing labels having been determined to match the selected label of the extracted data and to provide an option to select one of the set of pre-existing labels or a different pre-existing label in one of the plurality of records, wherein the different pre-existing label was not determined to match the selected entry of the extracted data.

These and other embodiments are described in further detail in the following description related to the appended drawing figures.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 6A-6C show an exemplary graphical interface for an embodiment of a file asset management system.

FIG. 12A shows an example of a legacy database.

DETAILED DESCRIPTION OF THE INVENTION

Specific embodiments of the disclosed method and system will now be described with reference to the drawings. Nothing in this detailed description is intended to imply that any particular step, component, or feature is essential to the invention.

The present application discloses use of a file-based digital source or "file." A file may be obtained from any digital source as known in the art or yet to be developed, and may exist in any digital container, domain, system, or other environment.

In a software environment where file-based assets are harvested for embedded data and metadata, and that data and/or metadata is collected and stored for various uses and presentations, individual extraction engines or magnets may be run making use of both proprietary and open-sourced or licensed extraction libraries and/or algorithms.

Any description herein of a file may comprise description of any content, such as any digital content. Any description herein of a file may comprise description of media, such as digital media, and vice versa. Any description herein of media may apply to any type of content or file. Any description herein of file asset management may refer to media asset management, or vice versa.

Figure 1A:
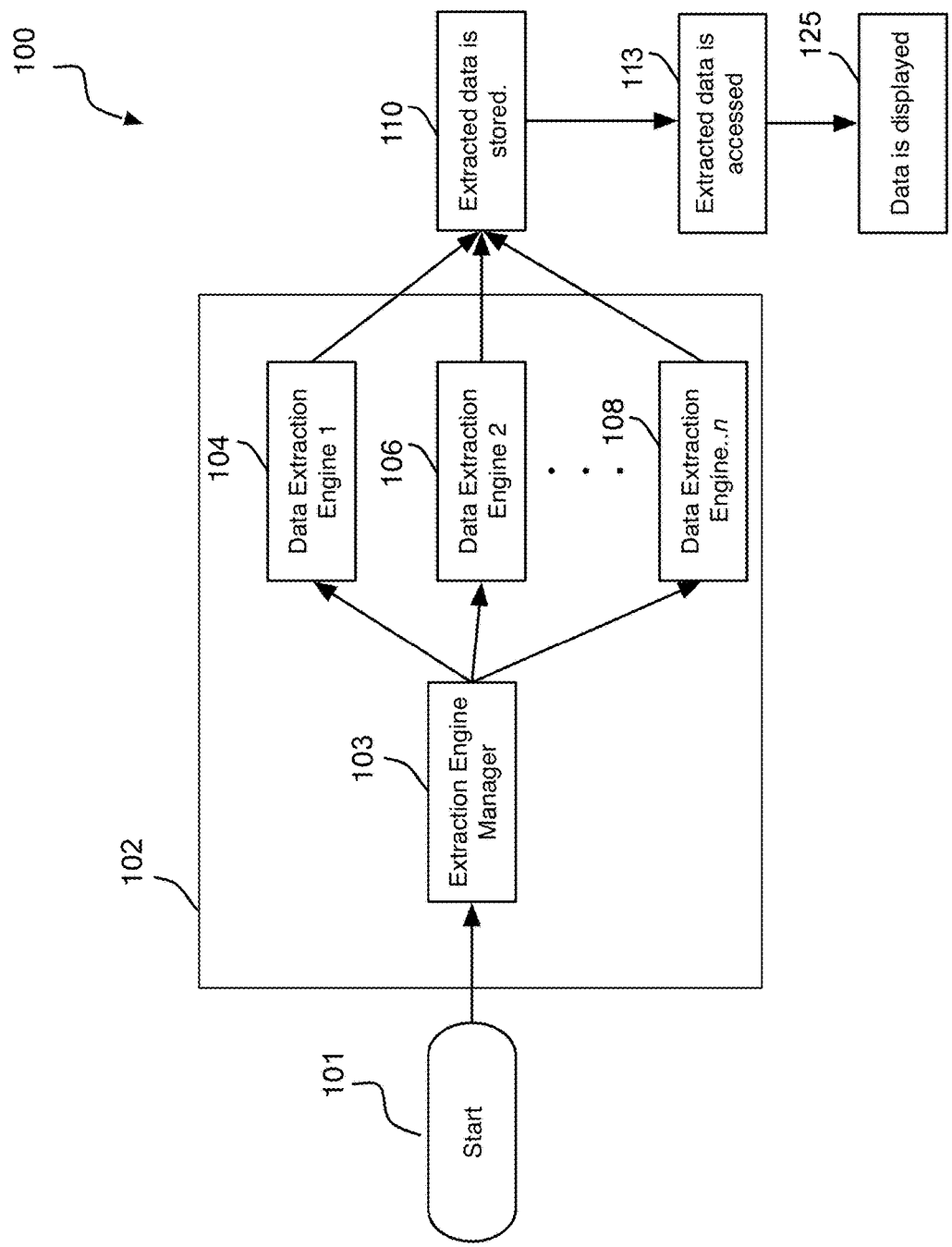
FIGS. 1A-1B are flowcharts showing a number of steps in an exemplary file asset management method.
Figure 1B:
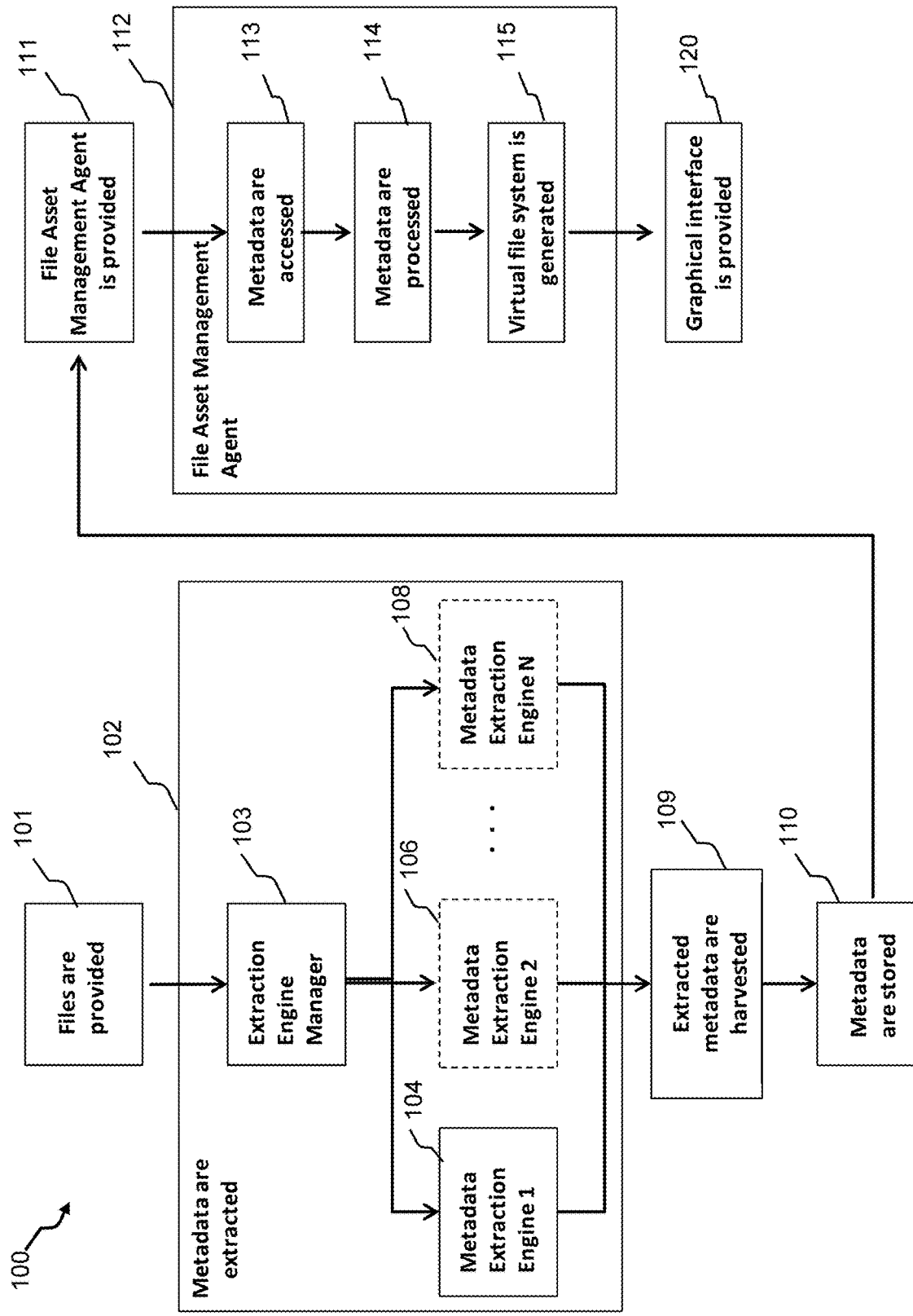

FIGS. 1A-1B are flowcharts showing a number of steps in an exemplary file asset management method 100 for providing centralized access, management, and customized visualization of digital content using a file asset management system comprising an automated file asset management agent. The file asset management method 100 may comprise providing one or more selected files that may exist in a file-based environment at 101 and extracting data or metadata at 102 from the one or more selected files by engaging one or more extraction engines 104, 106, and 108. At least one of the one or more selected files may have an original file system structure comprising at least one or more file components and associated file component relationships. The method may further comprise harvesting the extracted data or metadata at 109 from the one or more selected files, wherein the harvested data or metadata may comprise data or metadata related to the original file system structure of the at least one of the one or more selected files having an original file system structure, and storing the data or metadata harvested from the one or more selected files at 110. The extracted or harvested data or metadata may be stored in a data store.

As shown in FIG. 1B, an automated file asset management agent is provided at 111 that may interface with the data store. In particular, the automated file asset management agent may independently perform the steps of: (1) accessing the harvested metadata from the one or more selected files from the data store at 113; (2) processing the accessed metadata from the one or more selected files at 114, and (3) generating a virtual file system at 115 using the processed metadata from the one or more selected files to recreate the original file system structure of the at least one of the one or more selected files having an original file system structure.

A graphical interface for interacting with the interactable virtual file components may be provided at 120. The graphical interface provided at 120 may allow a user to access, manage, or modify the one or more selected files, the original file system structure of the at least one of the one or more selected files, and the at least one or more file components and associated file component relationships of the at least one of the one or more selected files. The virtual file system generated at 115 along with any virtual file components that it may comprise may be displayed at 125 and accessed through a graphical interface provided at 120. In addition, data or metadata associated with either the original or the virtual file system or the original or virtual file components may also be displayed at 125 and accessed through the graphical interface provided at 120.

As shown in FIGS. 1A-1B, providing a selected file at 101 may trigger an extraction engine manager 103 to programmatically engage at least a first extraction engine at 104 and a second extraction engine at 106. In a preferable embodiment, at least two different sets, types, or categories of data or metadata may be extracted through 104, 106, and/or any other additional extraction engines 108 respectively. The data or metadata extracted from the at least two extraction engines may be extracted in parallel at about the same time, or in series by engaging the extraction engines at different times. The extracted data or metadata may then be stored at 110.

In a preferable embodiment, a subset of the data or metadata extracted at 102 comprises the original context of the file harvested. For example, the metadata extracted at 102 may comprise the Universal Naming Convention (UNC) path of the file, the permissions, and other contextual data gathered by the file asset management system. This metadata may then be used to recreate, graphically, visually, logically, virtually and otherwise, the content of the files harvested for use. For example, a virtual file system may be generated at 115 that comprises interactable virtual file components corresponding to the at least one or more file components of the original file system structure. In a preferable embodiment, this metadata may be used to generate programmatically a graphical user interface (GUI) at 120 that displays all the files harvested in a manner that is similar to common file systems and operating system. For example, a user might see folders, whereby clicking on the folders, the user might see files or subfolders contained in the folders, whereby clicking on the subfolders a user might see files or even more subfolders.

Figure 2:
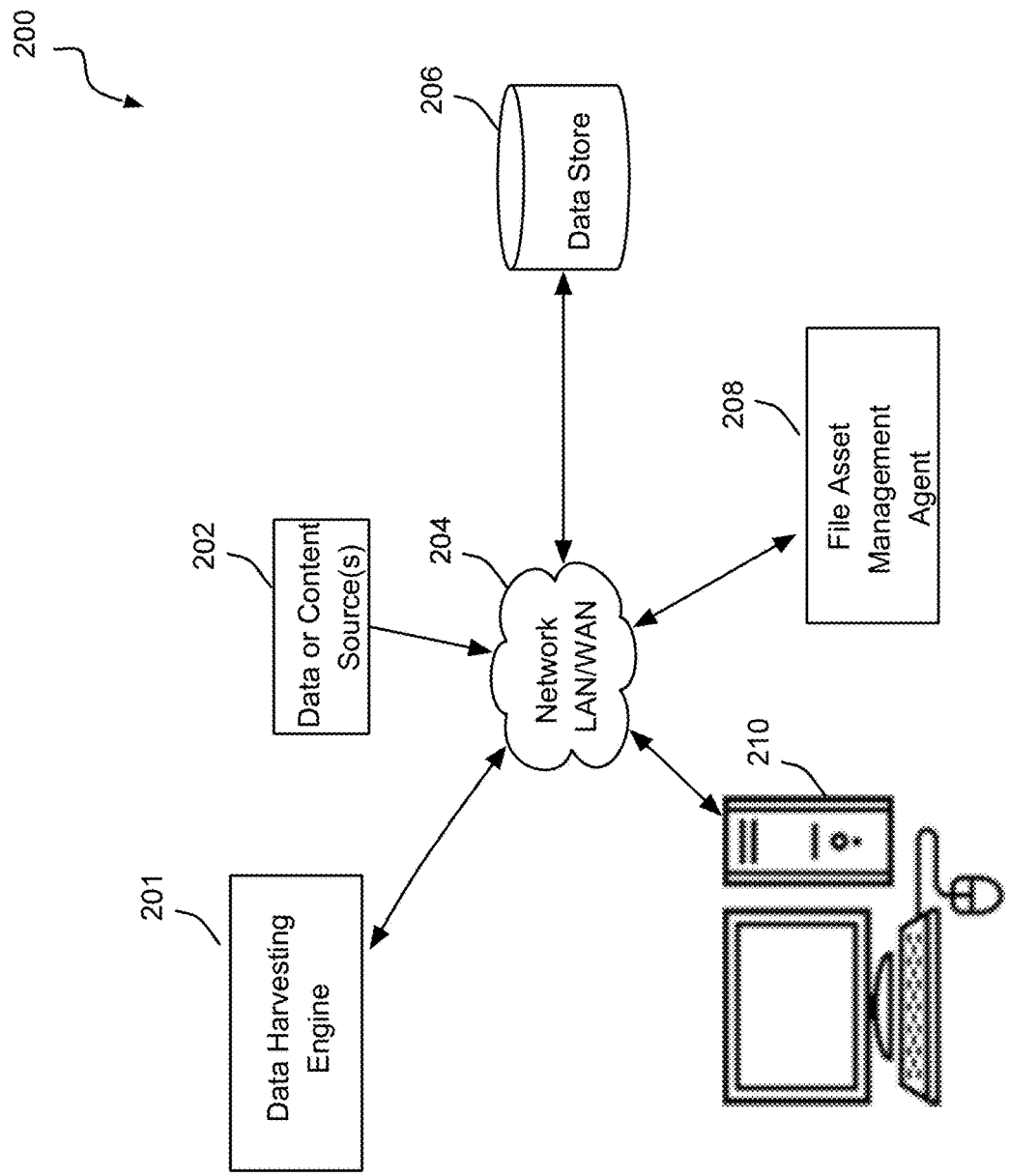
FIG. 2 is a schematic diagram illustrating an example of an operational environment for an embodiment of a file asset management system.

FIG. 2 is a schematic diagram illustrating an example of an operational environment for an embodiment of a file asset management system 200 comprising a file asset management agent 208. In a preferable embodiment, a File Asset Management System may comprise Data or Content Source(s) 202 (i.e. one or more sources of digital content), Data Harvesting Engine 201, Data Store 206, File Asset Management Agent 208, and computer interface system 210. Various components of the File Asset Management System 200 may be linked through any communication protocol in Network 204. In particular, Data Harvesting Engine 201 may communicate with Data or Content Source(s) 202 through any communication protocol or network in LAN/WAN 204. A data harvesting mechanism may start putting or storing harvested data or metadata in a Data Store 206, which can be of any database or data storage variety. File Asset Management Agent 208 may process the data or metadata in the Data Store 206 and prepare it for graphical use or access. The processed metadata may then be reviewed using a computer interface system 210. Data or Content Source(s) 202 may be one or more of any device or system capable of storing or hosting files or data represented in some other fashion. It should be appreciated that the formats in which the data sets are presented are not limited, nor is the size or number of files, folders, directory structures, directory trees, or other file system related structures.

Network 204 may be any local area network (LAN) or wide area network (WAN) or any other network as known in the art or yet to be developed. When Network 204 is configured as a LAN, the LAN may be configured as a ring network, a bus network, a wireless local network and/or any other network configuration. When Network 204 takes the form of a WAN, the WAN may be the public-switched telephone network, a proprietary network, the public access WAN commonly known as the Internet, and/or any other WAN configuration.

Regardless of the actual network used, in a preferable embodiment data may be exchanged over Network 204 using various communication protocols. For example, transmission control protocol/Internet protocol (TCP/IP) may be used if Network 204 is the Internet. Proprietary data communication protocols may be used when Network 204 is a proprietary LAN or WAN. While File Asset Management System 200 is illustrated in FIG. 2 in connection with Network 204 coupled to Data or Content Source(s) 202 (which may also comprise data source devices), Data Harvesting Engine 201, Data Store 206, and File Asset Management Agent 208, it is worth noting that File Asset Management System 200 is not dependent upon network connectivity.

The various portions or components of File Asset Management System 200 and File Asset Management Agent 208 as well as the underlying metadata harvesting environment of Data Harvesting Engine 201 may be implemented in hardware, software, firmware, or combinations therefor. In a preferable embodiment, File Asset Management System 200 and File Asset Management Agent 208 may be implemented using a combination of hardware and software or firmware that is stored in memory and executed by a suitable instruction execution system. If implemented solely in hardware, as in an alternative embodiment, File Asset Management System 200 and File Asset Management Agent 208 may be implemented with any or a combination of technologies that are well-known in the field (e.g., discrete logic circuits, application specific integrated circuits (ASICs), programmable gate arrays (PGAs), field programmable gate arrays (FPGAs), etc.), or technologies yet to be developed.

Figure 3:
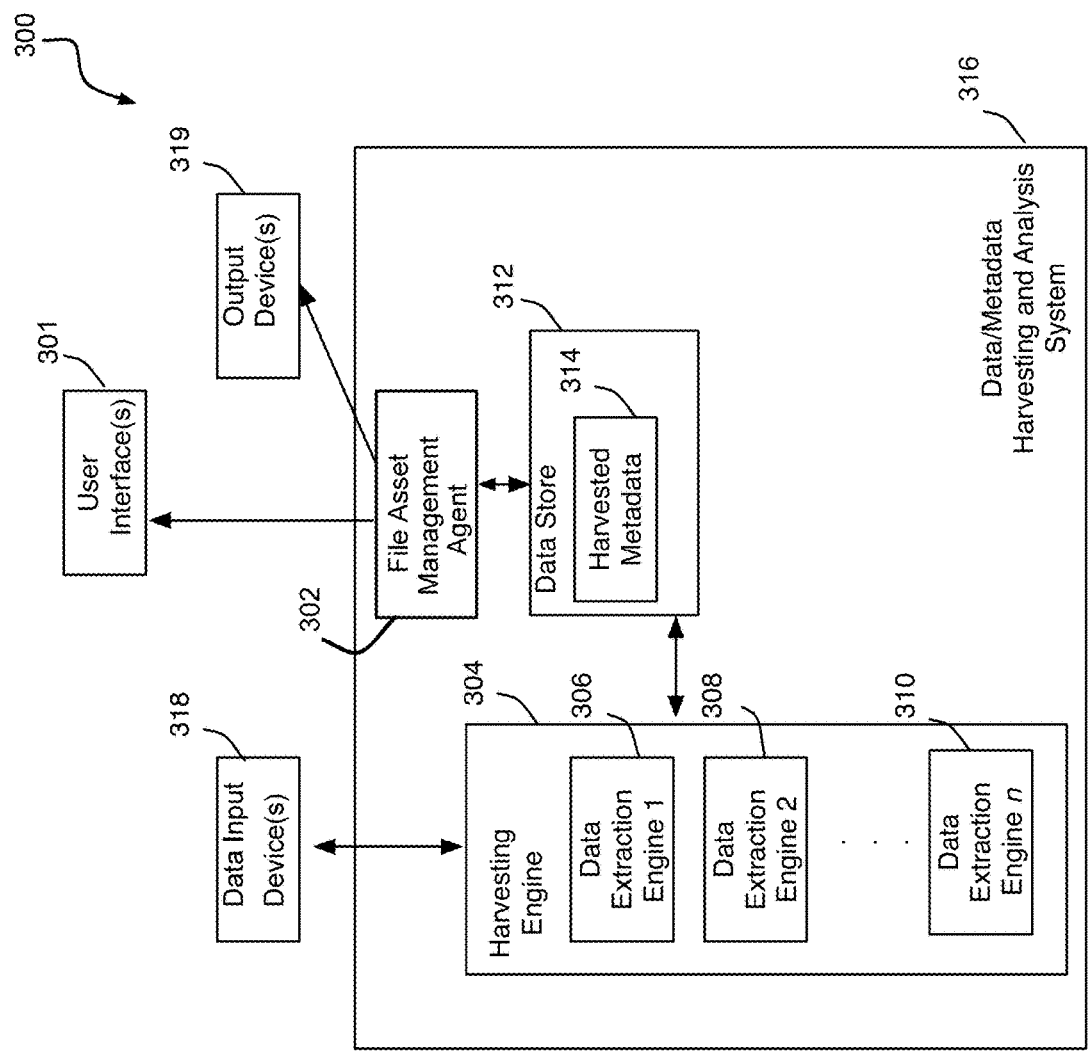
FIG. 3 is a block diagram showing a number of functional components of an embodiment of a file asset management system.

FIG. 3 is a block diagram showing a number of functional components of an embodiment of a File Asset Management System 300. In a preferable embodiment, File Asset Management System 300 may comprise User Interface(s) 301, Data Input Device(s) 318, Data/Metadata Harvesting and Analysis System 316, and Output Devices(s) 319. Data/Metadata Harvesting and Analysis System 316 may further comprise Harvesting Engine 304, File Asset Management Agent 302, and Data Store 312. Data/Metadata Harvesting and Analysis System 316 may receive data or files via Data Input Device(s) 318. For example, one of Data Input Device(s) 318 could be a mounted file system via a connection technology such as the Common Internet File System (CIF S) or Network File System (NFS) or any technology as known in the art or to be developed.

As further illustrated by FIG. 3, Data/Metadata Harvesting and Analysis System 316 may comprise Harvesting Engine 304, which may manage data extraction from Data Input Devices 318 that may be used to access or obtain data from one or more Data or Content Source(s) 202 as shown in FIG. 2. In a preferable embodiment, Harvesting Engine 304 may comprise one or more Data Extraction Engines 306, 308, and 310, which may be managed by an extraction manager as shown at 103 in FIGS. 1A-1B. The one or more Data Extraction Engines 306, 308, and 310 may each generate a different set, type, or category of data or metadata based on the same data or content source. The metadata that may be generated by Data Extraction Engines 306, 308 and 310 may be put or stored in Data Store 312, which may comprise any structured database, unstructured database, relational database, operational database, database warehouse, distributed database, end-user database or any database or data storage device as known in the art or yet to be developed. Harvested Metadata 314 may reside in any form in Data Store 312 alongside any other data relevant to the file system or the computing environment of Data/Metadata Harvesting and Analysis System.

File Asset Management Agent 302 may run as a function of Harvesting Engine 304, taking as input Harvested Metadata 314 stored in Data Store 312. File Asset Management Agent 302 may process each set of data and metadata in Harvested Metadata 314 to generate a logical, virtual, graphical, or visual representation of a file's relationships to other files and file components harvested by Harvesting Engine 304. The generated representation, for example in the form of a virtual file system, may be forwarded to one or more of Output Device(s) 319 or may be accessed by one or more User Interfaces 301.

In a preferable embodiment, File Asset Management Agent 302 may consider one or more sets, types, or categories of data or metadata harvested by Harvesting Engine 304. Moreover, File Asset Management Agent 302 may make available all metadata harvested by Harvesting Engine 304 in a logical, graphical, or visual way as a function of its output to one or more Output Device(s) 319 or as a function of its access by one or more User Interface(s) 301. File Asset Management Agent 302 may process and make accessible and/or output (push) all metadata harvested by Harvesting Engine 304 in any manner as known in the art or yet to be developed.

Additionally, File Asset Management Agent 302 may determine the specific sets, types, or categories of data or metadata to be made available, displayed, or used in processing the output, using various criteria whether user-configured or otherwise. In should further be appreciated that there is no limit on the data types File Asset Management Agent 302 may process, output, make available, or display. In particular, data types may comprise a classification of the media upon which the acquired digital data originated. By way of example, digital files may have been recorded via a video camera or otherwise acquired from various media types such as a computer hard drive, a digital video disc, a file system, or other media types as known in the art or yet to be developed. Information reflective of the media type may be used to organize, factor into search algorithms, or otherwise adjust or affect the resulting output format of File Asset Management Agent 302. In a preferable embodiment, an algorithm used by File Asset Management Agent 302 may be fine-tuned or otherwise adjusted in order to achieve more accurate results.

There are many different examples of displaying, browsing and making use of a file system or operating system. The structure, organization, and feature sets may vary between these examples. Notably however, File Asset Management Agent 302 is not limited to any one current example or implementation of a file system or operating system but may be applied to any type of file system, directory structure, folder structure, directory tree, file tree, file path, root path, and individual file detail organization and/or display as known in the art or yet to be developed.

Furthermore, File Asset Management Agent 302 and various other elements of Data/Metadata Harvesting and Analysis System 316 may be stored and operative on a single computing device or may be distributed among several memory devices under the coordination of a computing device.

Various information, such as but not limited to, data or metadata generated by File Asset Management Agent 302 may form a knowledge base (not shown) that may exist as part of Data Store 312. Regardless of its actual implementation, the knowledge base may contain information that the File Asset Management Agent 302 may use in an unlimited fashion to improve its own accuracy, or to evaluate new data sources or files to be analyzed.

While the functional block diagram presented in FIG. 3 illustrates a File Asset Management Agent 302 relating to a single centrally-located Harvesting Engine 304, Data Store 312, and Data Input Device(s) 318, it should be appreciated that the various functional elements of FIG. 3 may be distributed across multiple locations (e.g., with J2EE, .NET, enterprise Java beans, Hadoop clustering, or other distributed computing technology). For example, one or more of File Asset Management Agent 302 may exist in different locations, on difference servers, on different operating systems, and in different computing environments because of the flexibility provided by interaction via common interchange data (e.g., JSON.)

Figure 4:
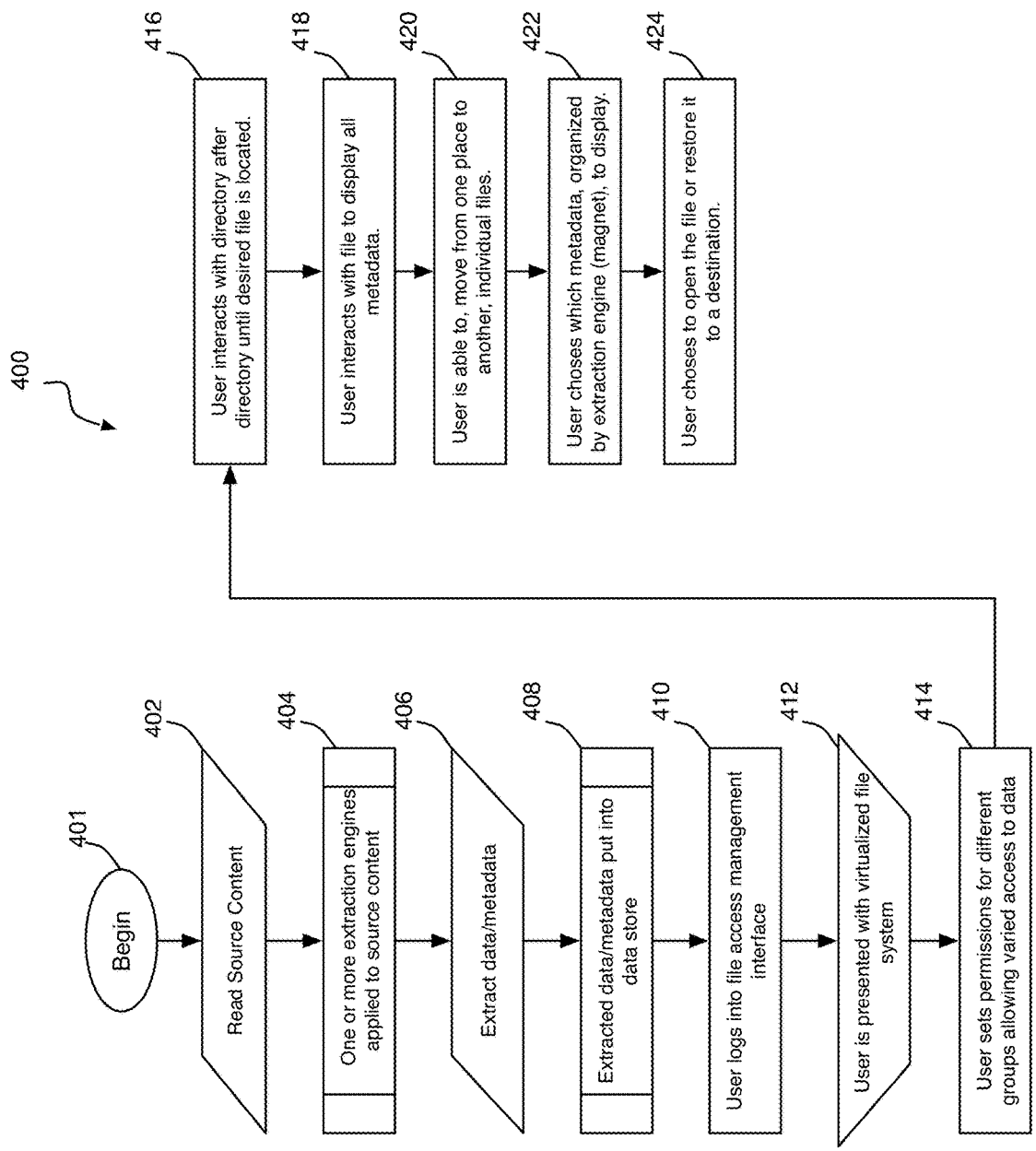
FIG. 4 is a flowchart showing an example of a programmatic application of an exemplary file asset management method.

FIG. 4 is a flowchart showing an example of a programmatic application of an exemplary embodiment of a file asset management method. File asset management method 400 may begin at 401 and may read and/or otherwise acquire source content or data as indicated in step 402. Next, the source content or data received in step 402 may be analyzed and interact with one or more extraction engines or magnets in step 404. The extraction engines or magnets in step 404 may output the data or metadata in step 406, which may be put or stored into a data store in step 408.

In step 410, a user may access a graphical interface implementation of the file asset management system provided via normal interface interaction methods such as an HTML browser or application running natively on the user's operating system. The user may be directed to log in or to authenticate his or her interaction with the file asset management system. Once logged in, the user may be presented in step 412 with a virtualized representation of the extracted and/or harvested data and metadata, presented in the form of a virtual file system, with root directories, disks, and sources displayed as interactable icons. The information to describe how this data or metadata appears may be accessed by the file asset management system from the data store either by a push or pull request, a data-interchange format, or some other communications protocol as known in the art or yet to be developed. The extracted and/or harvested data in the data store may be accessed and processed by a file asset management agent as described above, which may generate results visually or graphically to provide a virtual file system as either text, a web page, a user interface, an app or application, as a data-interchange format, or some other format as known in the art or yet to be developed.

In step 414, the user may be able to interact with a settings, control, or configuration view, or page of a graphical interface provided to allow the user to access and configure the file asset management system. In particular, the graphical interface provided may enable the changing, setting, allocating, or otherwise interacting with permissions, authentication, and access to the file asset management system, organized by group, name, login, e-mail, username or any other uniquely identifiable means.

In step 416, the user may be able to interact with the interactable icons, components, or graphical representations of directories provided through the graphical interface. In particular, a user may select, click, interact, tap, access or otherwise engage an interactable icon or component to display the contents therein, recursively, until the desired individual data source or file is displayed or accessible. In step 418, the user may interact with an interactable icon or component representing a data source, content source, or file, displaying a configurable selection of metadata and data related to the data source, content source, or file selected as provided by the graphical interface.

In step 420, in a preferable embodiment and depending upon permissions allocated as provided by the graphical interface, a user may indicate that a file, data source, or content source be moved from one place to another that is accessible by the file asset management system environment.

In step 422, a user may, in a preferable embodiment as provided by the graphical interface, configure, select, allocate, organize, rearrange, and customize the display of data and metadata for every source of data or file. The data and metadata may be presented through the graphical interface in an organized fashion, for example sorted by extraction engine or magnet. A user may select, configure, or customize where in the display the data and metadata appear as provided by the graphical interface.

In step 422, a user may select to have direct access to a data source, content source, or file, by selecting an option to open or restore the data source, content source, or file as provided by the graphical interface.

Figure 5:
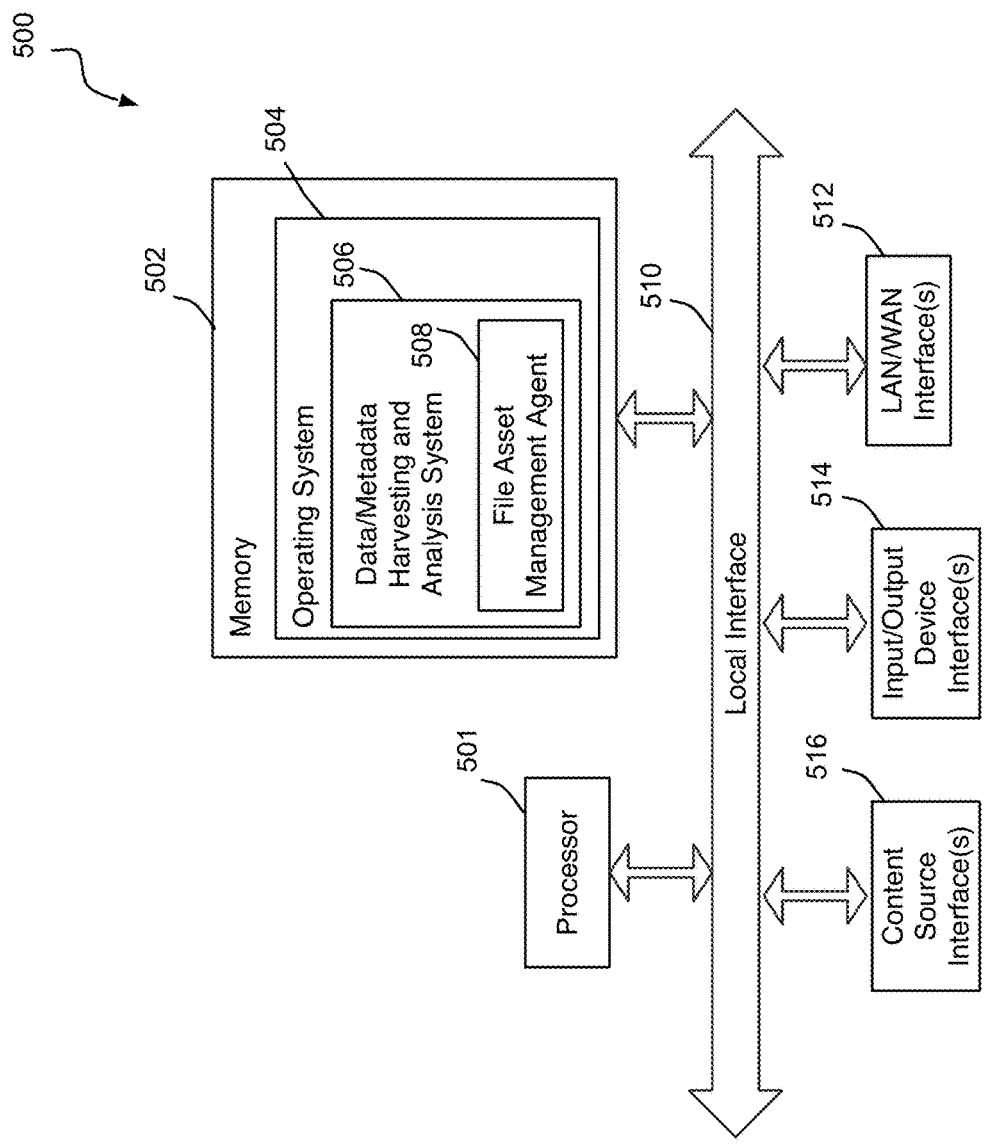
FIG. 5 is a functional block diagram illustrating an example of a computing device running an embodiment of a file asset management system.

FIG. 5 is a functional block diagram illustrating an example of a computing device running an embodiment of a file asset management system. Generally, in terms of hardware architecture, Computing Device 500 may include Processor 501, Memory 502, Content Source Interface(s) 516, Input/Output Device Interface(s) 514, and LAN/WAN Interface(s) 512 that are communicatively coupled via Local Interface 510. Memory 502 may further comprise Operating System 504, Data/Metadata Harvesting and Analysis System 506, and File Asset Management Agent 508.

Local Interface 510 may comprise one or more buses or other wired or wireless connections, as known in the art or yet to be developed. Local Interface 510 may comprise additional elements (not shown) such as controllers, buffers (caches), drivers, repeaters, receivers, and other components as known in the art or yet to be developed to enable communications. Local Interface 510 may also comprise address, control, and/or data connections to enable appropriate communications among the aforementioned elements or components.

Processor 501 may be a hardware device for executing software that may be stored in Memory 502. Processor 500 may be any custom-made or commercially-available processor, a central processing unit (CPU), or an auxiliary processor among several processors associated with the computing device, a semi-conductor-based microprocessor (in the form of a microchip), or a macroprocessor.

Memory 502 may include any one or combination of volatile memory elements (e.g., random access memory (RAM, such as dynamic RAM or DRAM, static RAM or SRAM etc.)) and nonvolatile memory elements (e.g., read-only memory (ROM), hard drives, tape drives, compact discs (CD-ROM), etc.). Moreover, Memory 502 may incorporate electronic, magnet, optical, and/or other types of storage media as known in the art or yet to be developed. Memory 502 may have a distributed architecture, where various components are situated remote from one another, but may still be accessed by Processor 501.

The software in Memory 502 may include one or more separate programs, each of which comprises an ordered listing of executable instructions for implementing logical functions. In a preferable embodiment as shown in FIG. 5, the software in Memory 502 may include Data/Metadata Harvesting and Analysis System 506 and File Asset Management Agent 508 that functions as a result of and in accordance with Operating System 504.

In a preferable embodiment, Operating System 504 may control the execution of other computer programs, such as Data/Metadata Harvesting and Analysis System 506, and may provide scheduling, input-output control, file and data management, memory management, system configuration, and communication control and related services.

File Asset Management Agent 508 may comprise one or more source programs, executable programs (object code), scripts, or other collections each comprising a set of instructions to be performed. The programs, scripts, or other collections implementing the File Asset Management Agent 508 may be written in a number of programming languages as known in the art or yet to be developed.

Input/Output Device Interface(s) 514 may take the form of human/machine device interfaces for communicating via various devices, such as but not limited to, a keyboard, a mouse or other suitable pointing device or microphone. Input/Output Device Interface(s) 514 may further comprise a printer, a monitor, an external speaker, or any other human/machine device interface as known in the art or yet to be developed.

LAN/WAN Interface(s) 512 may include a host of devices that may establish one or more communication sessions between the computing device and the network LAN/WAN 204 of FIG. 2. In particular, LAN/WAN Interface(s) 512 may comprise a modulator/demodulator or modem (for assessing another device, system, or network), a radio frequency (RF) or other transceiver, a telephonic interface, a bridge, an optical interface, a router, or any other two-way communication device as known in the art or yet to be developed.

When the computing device is in operation, Processor 501 may be configured to execute software stored within Memory 502, to communicate data to and from Memory 502, and to generally control operations of Computing Device 500 pursuant to the software. File Asset Management Agent 508 and Operating System 504, in whole or in part, but typically the latter, may be read by Processor 500, perhaps buffered within Processor 500, and then executed.

Figure 6A:
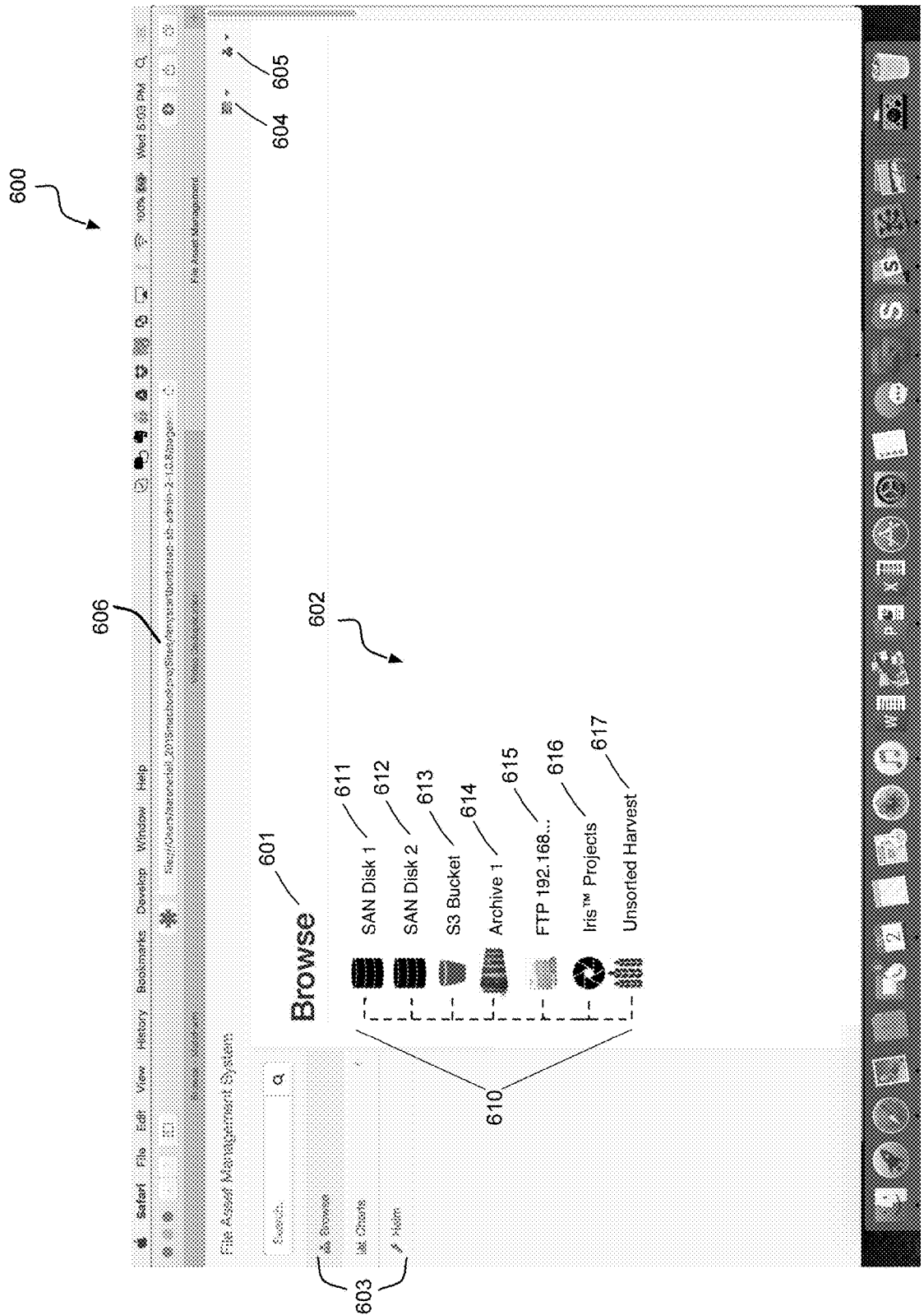

FIG. 6A shows an exemplary graphical interface 600 for an embodiment of a file asset management system. Graphical interface 600 may comprise a web page in HTML format that may generated by a file asset management agent as described in the present disclosure using the results of processing or analyzing data or metadata stored in the data store. A user may access graphical interface 600 by entering a URL or location at 606 to a hosted version of the file asset management system.

Figure 6B:
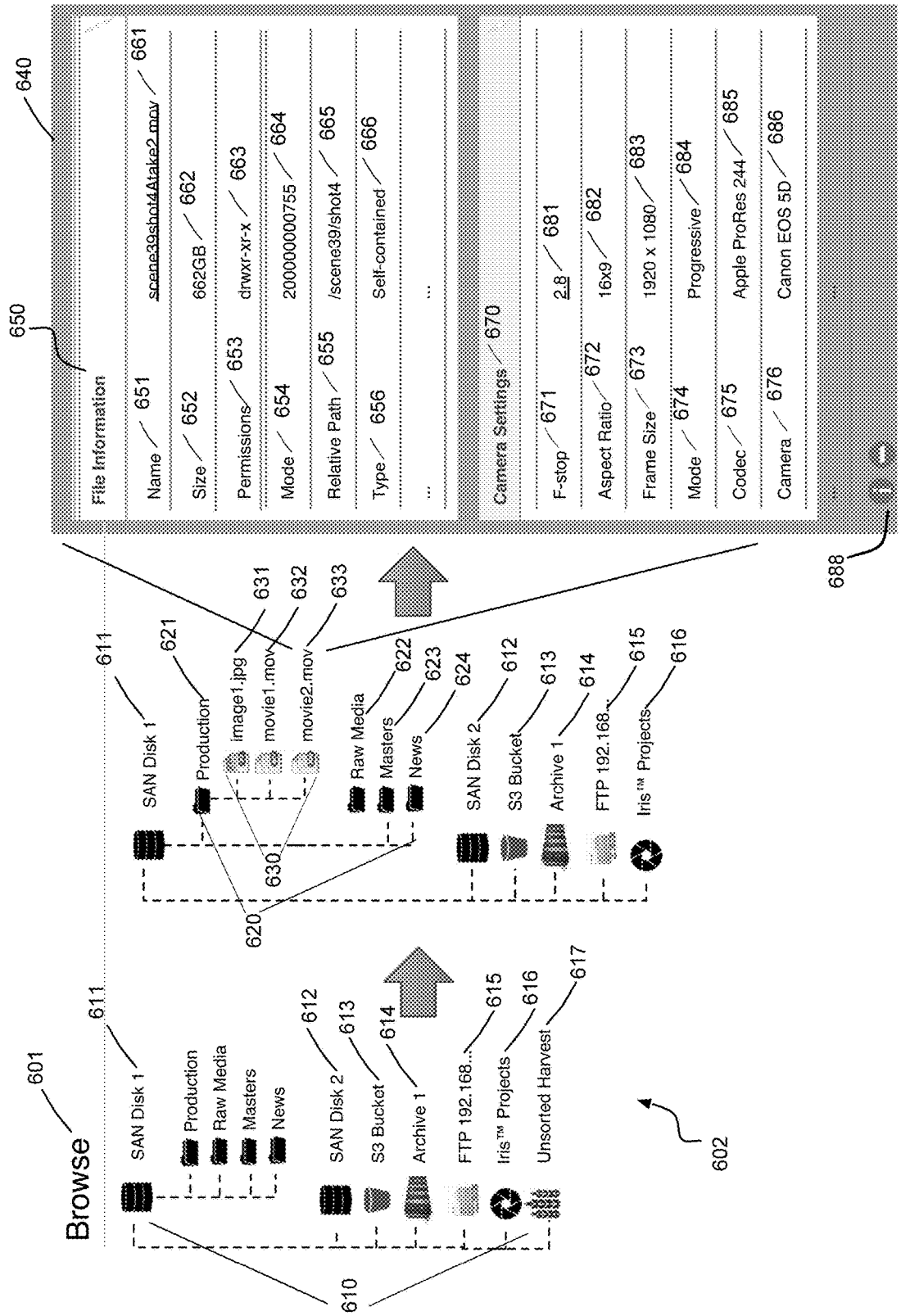

Graphical interface 600 may comprise various views or pages that may be accessed by selection elements 603, 604, and 605. The various views or pages of graphical interface 600 may provide various displays, interactions, and functionality to a user. FIGS. 6A-6B show a Browse View 601 displayed using the graphical interface 600. A graphical representation 602 as shown in FIGS. 6A-6C may be provided in the Browse View 601 in which the original sources of data, as understood by algorithms and processing engines of the file asset management agent, may be displayed and organized as a virtualized representation or virtual file system 602.

In a preferable embodiment, the virtual file system 602 may display interactable virtual file components 610 in the form of icons or symbols representing the highest level of a file system or storage hierarchy (i.e. the level for which no parents exist) for every system harvested and processed by the file asset management agent. The interactable virtual file components 610 may comprise various data sources or content sources, or root directories as shown by elements 611-616 in FIGS. 6A-6B. Any data or metadata that does not share a single root directory or location with at least one other piece of data may be placed into a miscellaneous category, such as Unsorted Harvest 617.

FIG. 6B shows the Browse View of FIG. 6A after a user interaction. In particular, as shown in the Browse View 601 of FIG. 6B, a user may select, click, interact, tap, access or otherwise engage an interactable virtual file component 610 in the virtual file system 602. The selected interactable virtual file component 610 may be a root directory or disk such as SAN Disk 1 611 as shown in FIG. 6B. Upon selecting a root directory or disk, any subdirectories or folders 621-624 residing as children of the root directory or disk (i.e. in this example, one level below the highest level) may also be displayed as interactable virtual file components 620 in the virtual file system 602. A user may then select, click, interact, tap, access or otherwise engage any one of the displayed subdirectories or folders 621-624, such as for example Production folder 621 as shown in FIG. 6B, to expand and display the contents therein.

In the example shown in FIG. 6B, the contents of Production folder 621 may be individual files 631-633 displayed as interactable virtual file components 630 in the virtual file system 602. A user may select, click, interact, tap, access or otherwise engage one of the individual files 631-633, such as for example the movie2.mov file 633, in order to display additional information 640 regarding the selected file in the virtual file system 602.

In a preferable embodiment, additional information 640 may comprise a subset of metadata and data from the selected file or data source (in this case the movie2.mov file 633), which may include File Information 650 and Camera Settings 700 for the selected file movie2.mov 633, as shown in FIG. 6B. File Information 650 may comprise data or metadata related to the selected file, including for example: Name 651, Size 652, Permissions 653, Mode 654, Relative Path 655, and Type 656 each with associated values shown by elements 661-666 respectively. Similarly, Camera Settings 670 may comprise additional data including for example: F-stop 671, Aspect Ratio 672, Frame Size 673, Mode 674, Codec 675, and Camera 676 with associated values shown by elements 681-686 respectively.

The display of the Additional Information 640 may comprise a window further comprising a selection element 688 that may be presented in the form of a symbol, button, or icon that indicates the availability of further information. A user may select, click, interact, tap, access or otherwise engage selection element 688, to navigate to a different view of the graphical interface—for example, a Data/Metadata View 700 as shown in FIG. 7.

Figure 7:
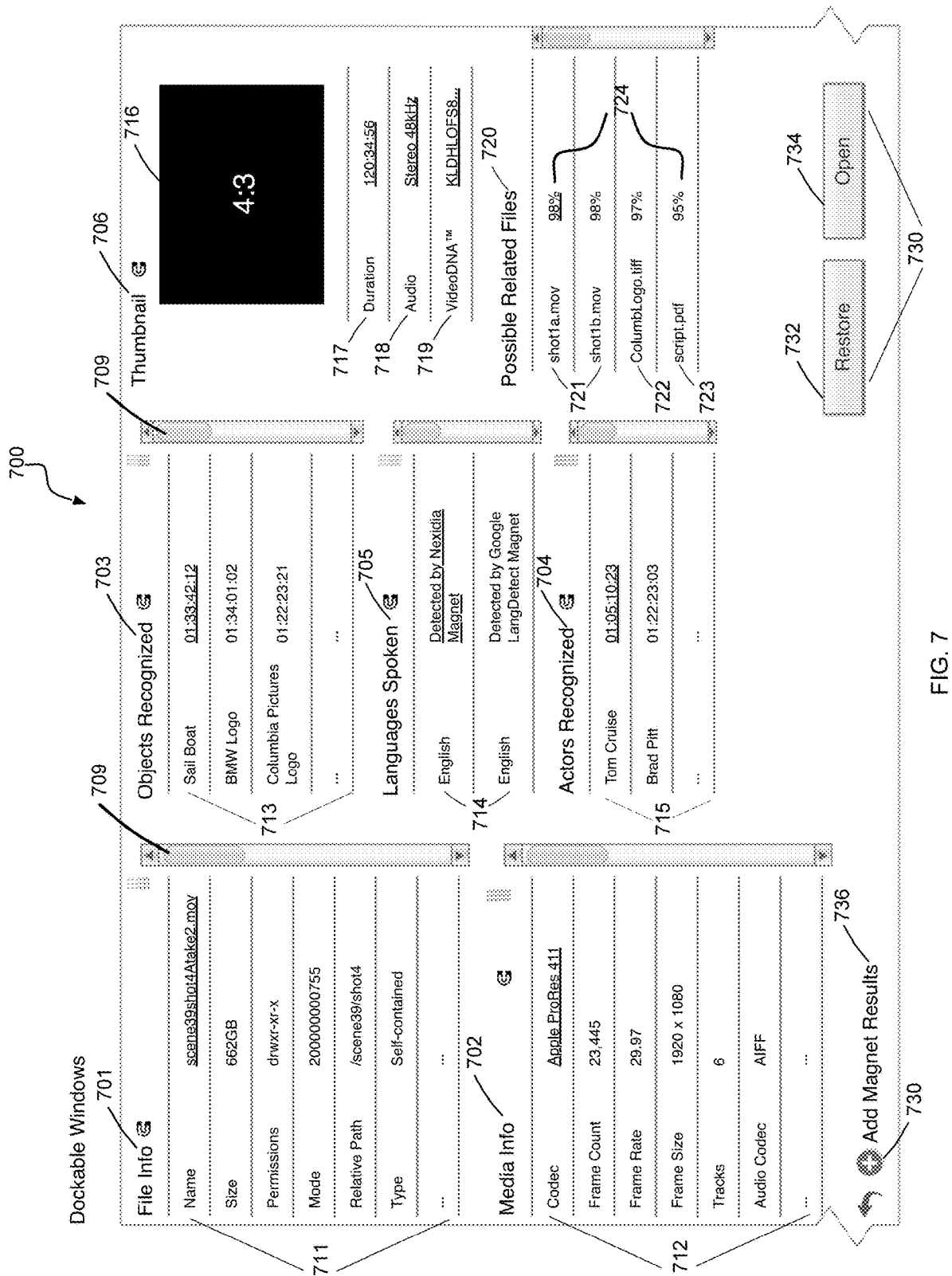
FIG. 7 shows a view of the graphical interface of FIG. 6 after a user interaction.

FIG. 7 shows an example of a Data/Metadata View 700 accessed via selection element 688 of Additional Information 640 provided using the graphical interface 600 of FIG. 6. In a preferable embodiment, the Data/Metadata View 700 as shown in FIG. 7, enables a user to visualize, organize, and display data or metadata for a given file, data source, or content source according to a user's preferences. As described above with respect to FIGS. 1A-1B, one or more extraction engines or magnets 104, 106, or 108, may be used to extract at least two different types or categories of data or metadata. These different categories or subsets of data or metadata may be organized by the respective extraction engine or magnet used to extract each different category or subset of data or metadata from a file, data source, or content source.

In a preferable embodiment as shown in FIG. 7, different categories or subsets may comprise the following types or categories of data or metadata: File Information 701, Media Information 702, Objects Recognized 703, Actors Recognized 704, Languages Spoken 705, and Thumbnail 706. The data or metadata 711-719 corresponding to or associated with each type or category of data or metadata 701-706 may be listed, displayed, or presented under its associated type or category heading 701-706 respectively. For example, as shown in FIG. 7, the magnet or extraction engine shown as Thumbnail 706 may comprise various data or metadata such as a visual or graphical thumbnail image 716 of a file, data source, or content source, which may be displayed alongside or proximal to other types of data and metadata such as Duration 717, Audio 718, and VideoDNA 719.

In a preferable embodiment, a media file identifier or VideoDNA 719 for the selected file movie2.mov 633 may be provided and displayed as shown in FIG. 7. The media file identifier or VideoDNA 719 characterizes, corresponds to, or may in some cases, uniquely represent a particular media file (in this case, movie2.mov 633) and may thus serve as a signature, fingerprint, or VideoDNA of the media file. A media file identifier or VideoDNA 719 may be generated and provided for example, by using a method and system as disclosed in U.S. 62/281,711 entitled "Method and System for Determining Media File Identifiers and Likelihood of Media File Relationships," which is incorporated herein by reference in its entirety.

Files that are identified as possibly related to a selected file in the virtual file system for example, by using a method and system as disclosed in U.S. 62/281,711 entitled "Method and System for Determining Media File Identifiers and Likelihood of Media File Relationships" as mentioned above, may be displayed and accessed through the Data/Metadata View 700 under Possible Related Files 720. As shown in FIG. 7, the identified files displayed under Possible Related Files 720 may comprise different types or categories of files, such as movies or videos such as shot1a.mov and shot1.b.mov at 721, images such as ColumbLogo.tiff at 722, or text files such as script.pdf at 723. Data/Metadata View 700 may provide interactive links to each of the identified related files, for example by allowing the user to select the file name in order to access, view, or download a particular related file listed or displayed under Possible Related Files 720.

In a preferable embodiment, a corresponding similarity or likelihood metric 724 may be displayed proximal to or alongside each identified file listed or displayed under Possible Related Files 720. The similarity or likelihood metric 724 may capture or represent a degree of similarity between each identified file under Possible Related Files 720 and the selected file in the virtual file system, in this case, the file movie2.mov at 633 as shown in FIG. 6B. As shown in FIG. 7, the identified files displayed under Possible Related Files 720 may also be ordered according to their respective degree of similarity to the selected file movie2.mov, with the identified file having the highest degree of similarity to the selected file (i.e. shot1a.mov with a similarity of 98%) in the virtual file system displayed at the top of the list.

The data or metadata displayed in FIG. 7 may extend beyond the displayable size of Data/Metadata View 700 of the graphical interface. As such, interactive guides such as Scroll Bars 709 may be implemented to provide additional viewing of the displayed data or metadata.

A user may select, click, interact, tap, access or otherwise engage a selection element 730, which may provide additional functionality. For example, by selecting the selection element Restore 732, a user may copy a selected file, data source, or content source accessed through the virtual file system to a pre-configured digital destination such as a connected computer, network attached storage, online or offline digital destination, or any other destination as known in the art or yet to be developed that can accommodate the selected file, data source, or content source. By selecting the selection element Open 734, a user may directly open the selected file, data source, or content source on a computer, digital device, workstation, terminal, interactive tool, or other human interface device as known in the art or yet to be developed that may be used to interact with the file asset management system.

Data/Metadata View 700 may be user configurable and customizable according to a user's display preferences. In particular, a selection element 730 such as Add Magnet Results 736 may be provided that, when selected by a user, allows the user to navigate to a Configuration View 800 of the graphical user interface as shown in FIG. 8, that allows a user to configure and customize the display of data and metadata in the Data/Metadata View 700.

Figure 8:
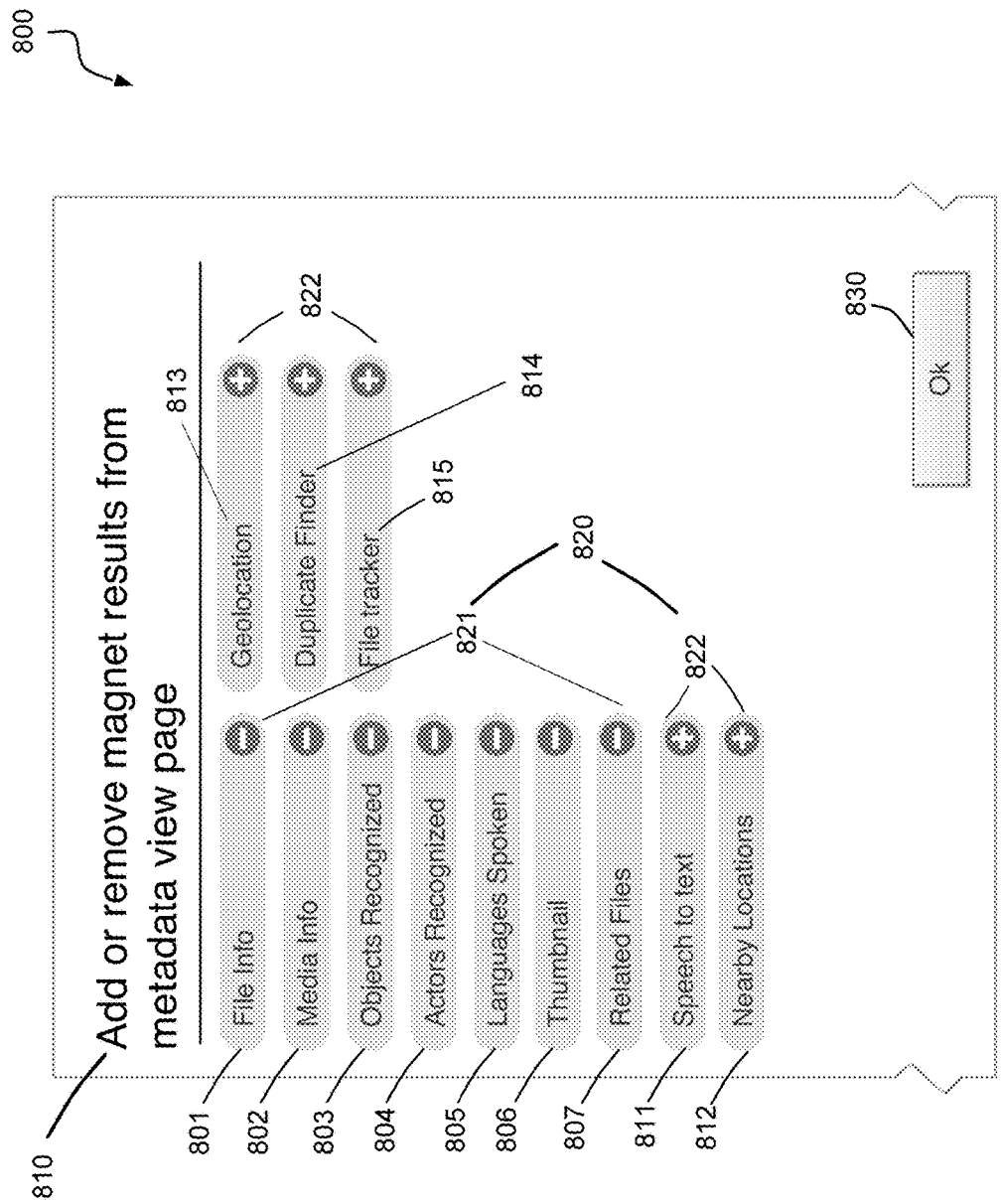
FIG. 8 shows a view of the graphical interface of FIG. 6 accessed via the view of FIG. 7.

FIG. 8 shows an example of another view 800 accessed through graphical interface 600 of FIG. 6A. Configuration View 800 as shown in FIG. 8 may enable a user to customize the display provided through graphical interface 600. More specifically, in a preferable embodiment, Configuration View 800 may enable a user to change, configure, modify, set, affect or otherwise determine the way data or metadata are displayed, presented, and accessed on the Data/Metadata View 700 of FIG. 7. Configuration View 800 may comprise a heading or title 810 indicating what modification a user may implement, such as adding or removing a particular type, category, or set of data or metadata extracted by one or more extraction engines or magnets. For example, as shown in FIG. 8, different categories or subsets may comprise the following types of data or metadata: File Information 801, Media Information 802, Objects Recognized 803, Actors Recognized 804, Languages Spoken 805, Thumbnail 806, Related Files 807, Speech to text 811, Nearby Locations 812, Geolocation 813, Duplicate Finder 814, and File tracker 815.

To provide a user with an ability to add or remove various sets, types, or categories of data or metadata as organized by extraction engine or magnet, selection elements 820 may be located alongside each set, type, or category of data or metadata. Selection elements 820 may be used to select, for example by adding or removing, a set of data or metadata extracted by one or more extraction engines or magnets. An indicator on the selection element, such as a plus 822 or a minus 821 sign or symbol, may be used to indicate whether the set of data or metadata is available to be added or not.

As shown in FIG. 8, the sets of data or metadata 801-807 that have been already selected by the user (i.e. the sets of data or metadata that are currently displayed in the Data/Metadata View 800 and are therefore are not available to be added) have a minus sign 821 indicator on each of their respective selection elements 820. The sets of data or metadata 811-815 that have not been selected by the user and are available for adding to the Data/Metadata View 800 are have a plus sign 822 indicator on each of their respective selection elements 820. Once a user is satisfied with the settings, configurations, or changes as displayed on Configuration View 800, a user may close or exit the Configuration View by selecting or engaging another selection element such as "Ok" at 830. As described above, Configuration View 800 may thus provide a user with the ability to determine the look and feel of the interface for viewing data and metadata (i.e. the Data/Metadata View 700) as well as determine what metadata or data is displayed, and how it is organized.

As shown FIG. 6A, a user may select, click, interact, tap, access or otherwise engage a selection element 603, 604 or 605 in the Browse View 601. In particular, a user may access a Permissions View 900 by engaging selection element 605 which may comprise a button, symbol, or icon such as the icon of a person shown in 605.

Figure 9:
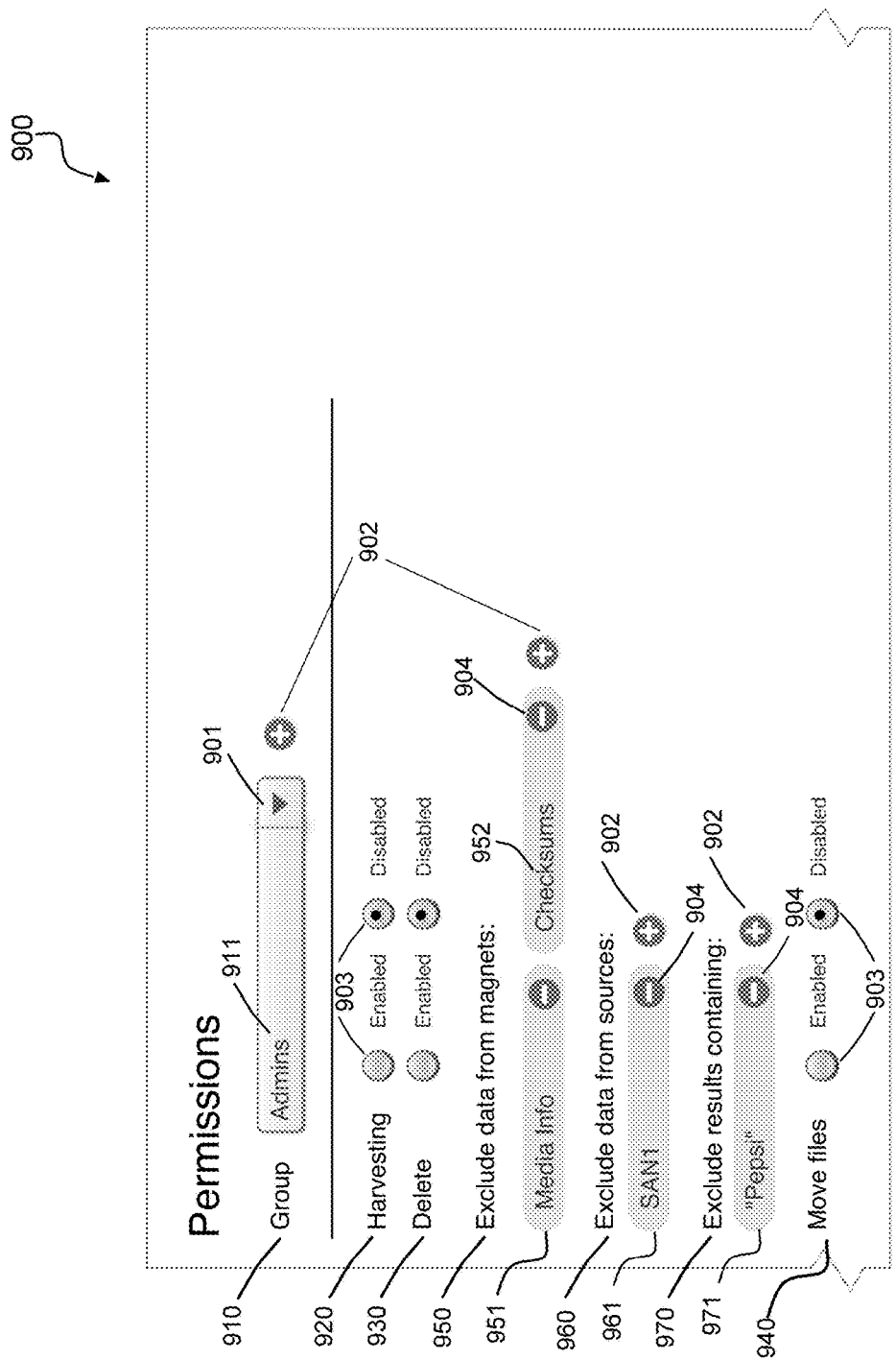
FIG. 9 shows another view of the graphical interface of FIG. 6 after a user interaction.

FIG. 9 shows an example of a Permissions View 900 accessed through the graphical interface 600 of FIG. 6A. In a preferable embodiment, Permissions View 900 provides a user the ability to select, designate, or assign permissions, authentication, settings, configurations, and roles for the user or other users. Users may be permitted to access, modify, and move or remove files or file components in a virtual file system and may also be permitted to take certain actions or access certain functionalities related to the access and management of the virtual file system. User settings, roles, and functionalities that may be configured include a setting for Group 910, and functionalities such as Harvesting 920, Delete 930, and the ability to move files 940. The function of excluding certain data or certain results may also be provided for Magnets 950, Data Sources 960, and Results 970. Selection elements 901-904 may be located alongside each user setting or functionality that may be configured by a user.

With respect to user settings or roles, Group 910 may be used to select a particular user group, which may be for example, a designated group of users having a certain role and requiring certain permissions to perform that role. Accordingly, the user group selected at Group 910 may be designated or assigned certain permissions with respect to actions and functionalities related to the access and management of the virtual file system. For example, in a preferable embodiment, a group designated as Admins 911 may comprise users having an administrative role with respect to the virtual file system. The Admins 911 may be selected as the user group to be configured via a dropdown menu selection element such as 901. Once a user group such as Admins 911 has been selected, certain functionalities may be enabled or disabled with respect to the selected user group, and certain data or results may be excluded from access for the selected user group.

The Permissions View 900 provides a user the ability to enable or disable certain features such as Harvesting 920, Delete 930, and the ability to move files 940 by selecting, clicking, interacting, tapping, accessing or otherwise engaging a selection element 903 as either "Enabled" or "Disabled." In particular, the selected user group as shown in Group 910 may be enabled or disabled to perform the functions of harvesting or deleting data or metadata, or may be enabled or disabled to move files by clicking the associated selection element 903 (i.e. indicating "Enabled" or "Disabled") with respect to the chosen action or functionality 920, 930, or 940 respectively.

Additionally, Permissions View 900 provides a user the ability to exclude certain data or results from access for the selected user group as shown in Group 910. In particular, a user may exclude, change, add, modify, rewrite, or otherwise affect the sets of data the particular group indicated in Group 901 may have access to by designating the set, type, or category of data or metadata under the element "Exclude data from magnets" at 950. As shown in FIG. 9, the Admins 911 user group has been excluded from accessing data or metadata from the Media Information dataset at 951 and from the Checksums dataset at 952. Selection elements 902 are provided to allow the user to add other datasets to be excluded from access (using a plus symbol as an indicator to add the dataset). Similarly, selection element 904 is provided to allow the user to remove a selected dataset currently being excluded, such as for example the Checksums dataset at 952. Note however that removing a selected dataset from the set of exclusions (i.e. the "Exclude data from magnets" at 950) would have the effect of permitting the selected user group to access that dataset.

A user may also exclude, change, add, modify, rewrite, or otherwise affect the sets of data the group indicated in Group 901 may have access to by designating the set, type, or category of data or metadata under the element "Exclude data from sources" at 960. As shown in FIG. 9, the Admins 911 user group has been excluded from accessing data or metadata from the data or content source SAN1 at 961. Selection elements 902 are provided to allow the user to add other datasets to be excluded from access (using a plus symbol as an indicator to add the dataset). Similarly, selection element 904 is provided to allow the user to remove a selected dataset currently being excluded. Note that removing a selected dataset from the set of exclusions (i.e. the "Exclude data from sources" at 960) would have the effect of permitting the selected user group to access that dataset.

A user may also exclude, change, add, modify, rewrite, or otherwise affect the sets of data the particular group indicated in Group 901 may have access to by specifying the exclusion of text, specific words, groups of letters, alphanumeric, or other configurable and customizable filter criteria under the element "Exclude results containing" at 970. As shown in FIG. 9, the Admins 911 user group has been excluded from accessing data or containing the text "Pepsi" at 971. Selection elements 902 are provided to allow the user to add other results to be excluded from access (using a plus symbol as an indicator to add the results). Similarly, selection element 904 is provided to allow the user to remove a selected result currently being excluded. Note that removing a selected result from the set of exclusions (i.e. the "Exclude results containing" at 970) would have the effect of permitting the selected user group to access datasets containing that result.

Selection elements 902 may be used to add additional elements, for example adding a user group under 910, adding a set of data or metadata to be excluded under 950, adding a data source to be excluded under 960, or adding criteria to be excluded from results under 970.

Once a user has been given the appropriate permissions using the Permissions View 900 as described with respect to FIG. 9, a user may take certain permitted actions or have access to certain functionality. In particular, a user may be assigned the permission to move files (i.e. "Move files" at 940 is selected as "Enabled" at 903 using the Permissions View 900 of FIG. 9).

FIG. 6C shows an example of a virtual file system 602 generated by an exemplary embodiment viewed through the graphical interface 600 of FIG. 6A. As shown in FIG. 6C, a user may select, click, interact, tap, access or otherwise engage an interactable virtual file component 610 in the virtual file system 602. The selected interactable virtual file component 610 may be a top level directory in the hierarchy (i.e. a directory having no parents) such as the directory "Unsorted Harvest" 617. Upon selecting a directory, any subdirectories, folders, or files residing as children of the root directory or disk (i.e. in this example, one level below the highest level) may also be displayed as interactable virtual file components 690 in the virtual file system 602.

A user having the permission (as configured for example using the Permissions View 900 of FIG. 9) to move files may take an action to visually, graphically, and otherwise virtually indicate that one or more files or file components in the virtual file system 602 (e.g. a file 633, folder 621, group of files 630 or folders 620, data or content source 611 or sources 610) may be moved or copied from one location to another location in the virtual file system. Corresponding to the user's action or modification of one or more files or file components in the virtual file system 602, the file asset management system may issue a request (not shown) to execute a corresponding action on the actual file or file components existing in an original file system. Notably, the original file system may exist in its own location and may have its own associated memory and other hardware components. The request may be made via an API, a query, a push request, a data-interchange format, or any other tool used to move files and file components as known in the art or yet to be developed. The corresponding action that is implemented on the selected file or file components existing in the original file system may require certain changes to be saved in a memory device or other hardware components associated with the original file system.

For example, as shown in FIG. 6C, a user may take an action, such as drag & drop 699, to visually, graphically, and otherwise virtually indicate that a selected file may be moved or copied from one location to another location in the virtual file system. In particular, FIG. 6C shows that the file "shot6.mov" at 696 may be moved using a "drag & drop" action 699 by the user from one location (i.e. in the directory "Unsorted Harvest" 617) to another location (i.e. the folder "Raw Media" 622). Corresponding to the user's action 699 to move "shot6.mov" from the Unsorted Harvest directory 617 to the Raw Media file 622 in the virtual file system 602, the file asset management system may issue a request to move the file "shot6.mov" from the actual Unsorted Harvest directory to the actual Raw Media file existing in the original file system. Once the corresponding action is executed on the original file system, any changes to the file, file components, or file structure resulting from the action, in this case moving the file "shot6.mov," may be saved in a memory device or in other hardware components associated with the actual file "shot6.mov" and the original file system on which it exists.

A file asset management method or system using a file asset management agent may be embodied in any computer-readable medium for use by or in connection with an instruction execution system, apparatus, or device, such as a computer-based system, processor-containing system, or other system that can fetch the instruction execution system, apparatus or device, and execute the instructions. A computer-readable medium may be any device or apparatus that can store, communicate, propagate, or transport a program for use by or in connection with the instruction execution system, apparatus, or device. For example, the computer-readable medium may be an electronic, magnetic, optical, electromagnetic, infrared, or semiconductor system, apparatus, device, or other propagation medium known in the art or yet to be developed. The computer-readable medium may even be paper or another suitable medium upon which the program is printed, as the program can be electronically captured, via for instance optical scanning of the paper or other medium, then compiled, interpreted or otherwise processed in an appropriate manner if necessary, and then stored in a computer memory.

The process descriptions or blocks in the flowcharts presented in FIGS. 1A-1B and FIGS. 2-5 may be understood to represent modules, segments, or portions of code or logic, which include one or more executable instructions for implementing specific logical functions or steps in the associated process. Alternative implementations are included within the scope of the present invention in which functions may be executed out of order from the order shown or described herein, including substantially concurrently or in reverse order, depending on the functionality involved, as would be understood by those reasonable skilled in the art after having become familiar with the teachings of the present invention.

In another aspect, the present application is directed to a computer-implemented method and system for consolidating disparate databases and for reconciling records into a common platform. In particular, the method and system in the present application can be used to automate the migration or importation of legacy databases into newer schemaless databases or metadata management platforms and to perform a comparison of data extracted from the legacy database to data contained in the records residing on the metadata management platform.

According to one embodiment, a user can export a database, such as legacy database, as a common database file (e.g. .CSV or .XML), and import the entire database into file asset management system or platform. The common database file format can often be formatted such that the first line before a carriage return represents the column headers in the original database. Each subsequent line can represent a row from the original legacy database. As such, one or more of the "cells" in this file can match the value of a field in the file asset management system or platform, for example, a database file that lists filenames and associated metadata in additional columns along each row. The file asset management system or platform can also contain a field called "filename" that can have the same metadata. When importing the legacy database output file into the file asset management system or platform, a determination can be made that a filename in the legacy database file matches an entry in the field called "filename" in the file asset management system or platform. Subsequently, the rest of the row in the database file can be imported as 'cells', the column headers for those rows (representing categories or labels for data) can be imported as new field names, and the value of those "cells" can be saved as values in fields in the file asset management system or platform. The effect is to add metadata from a legacy database system to existing records in a file asset management system or platform, thus effectively consolidating two disparate databases.

In another embodiment of this invention, no records in the file asset management system and platform are determined to match the imported data. As such, a user can import the legacy database file and the system can provide the user an option to create new records and allow the user to select the column header (category or label of data) used to create the new record. For example, a user can select 'filename' as the column header for creating a new record. The records can be imported from the legacy database file to the file asset management system or platform, with the filename being the name of the record. The data in the rest of each row in the legacy database file can be used to fill new fields that are based on the column headers in the legacy database file. This results in the creation of new records that are then added to the plurality of records accessed by or accessible to the file asset management system or platform. Accordingly, any new files that are imported, harvested, processed, or saved by the system can be matched against the newly created records, along with any existing records, and if a match to one of these records is found, the new file can be consolidated with the matching record instead of creating a redundant or duplicate record.

Figure 10A:
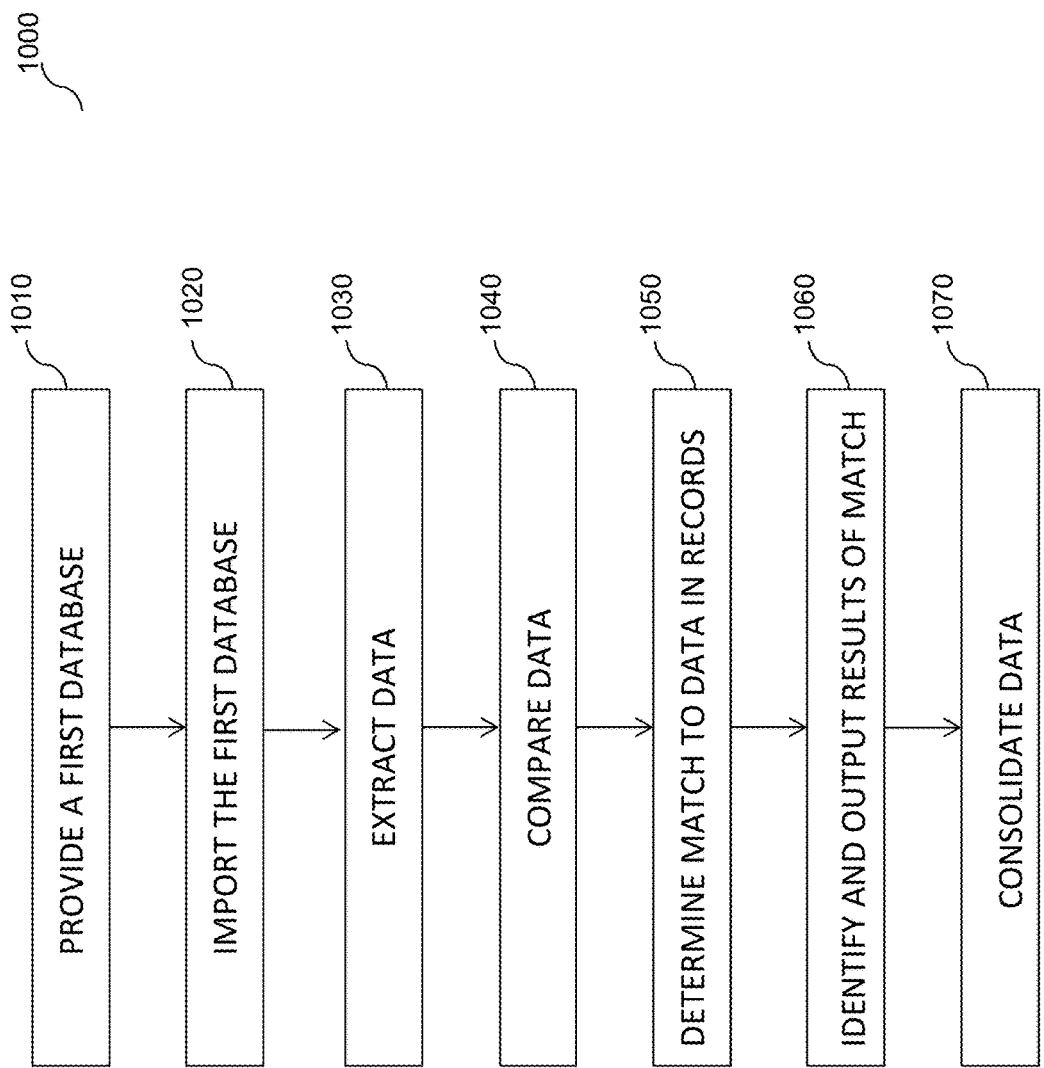
FIGS. 10A-B are flowcharts showing a number of steps in an exemplary database consolidation method.
Figure 10B:
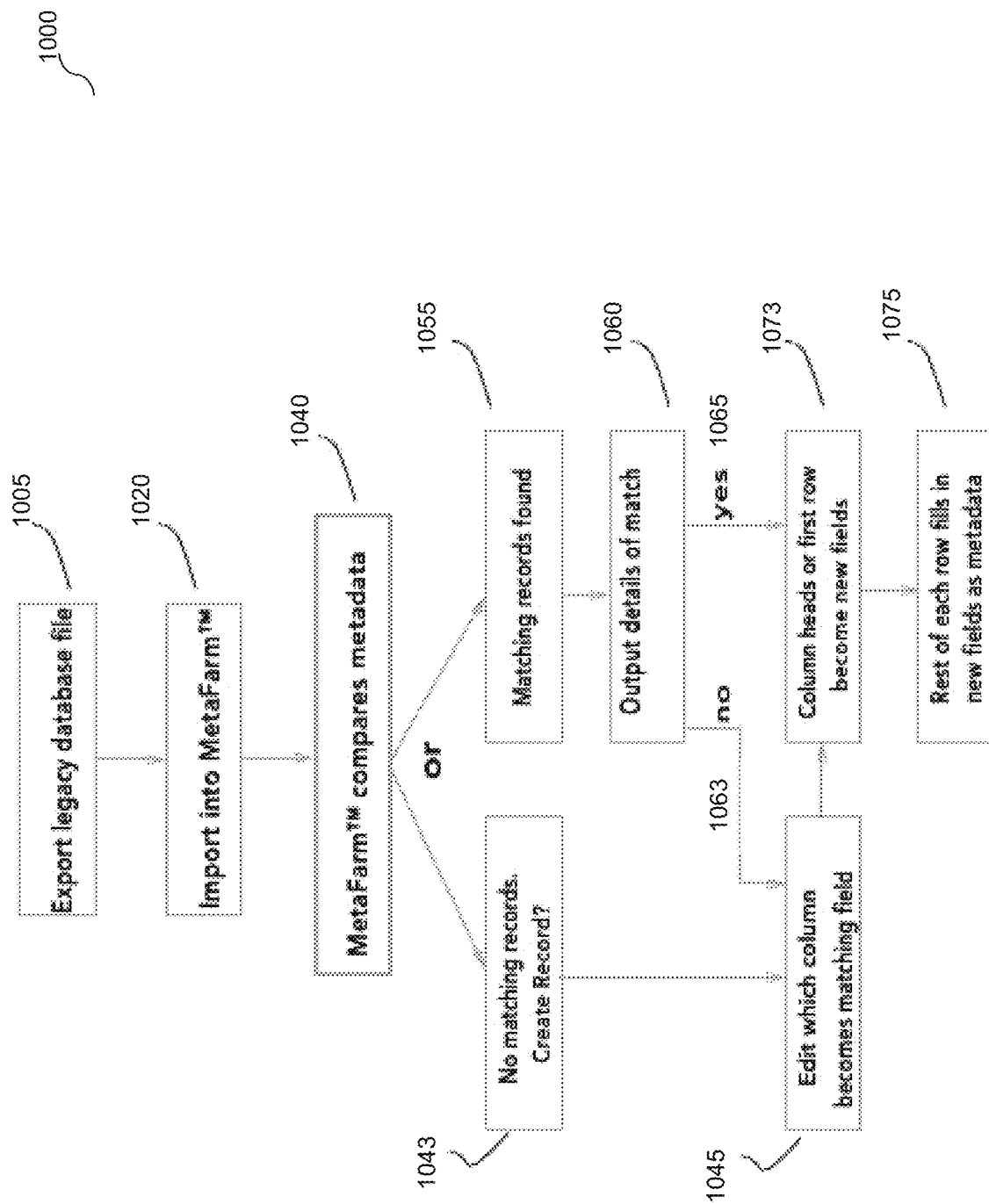

FIGS. 10A-B are flowcharts showing a number of steps in an exemplary computer-implemented method for consolidating disparate databases. As shown in FIG. 10A, a first database can be provided at 1010. The first database can be a legacy database or any other database that may or may not share a common format with previously harvested files and records that may reside in the file asset management system or platform.

An example of a legacy database is shown in FIG. 12A. The legacy database can have a table-like structure having columns 1210 and rows 1220. The first row 1221 of the legacy database can comprise categories, headers, or labels while subsequent rows 1222-1228 can comprise values or data corresponding to each category, header, or label in the first row. In particular, the example provided in FIG. 12A shows a legacy database having six columns: "FileName," "Date," "Photographer," "Producer," "Tags," and "Notes." Note that there may be several hundred rows of data with each cell containing information appropriate to the column it is in, wherein the first row contains or represents the column header (category or label) and the subsequent rows contain the values or data for each column header. For example, the first three values for the column header "FileName" are "img_dsc001," "img_dsc002," and "img_dsc003." In addition, in the example depicted in FIG. 12A, the entry having a FileName of "img_dsc001" has the values "01/01/03," "Melanie C.," "Arthur A." and "Sunset, trees" for each of the column headers or categories "Date," "Photographer," "Producer," "Tags," respectively. The "Notes" category in this case is empty or has a "null" value.

Figure 12B:
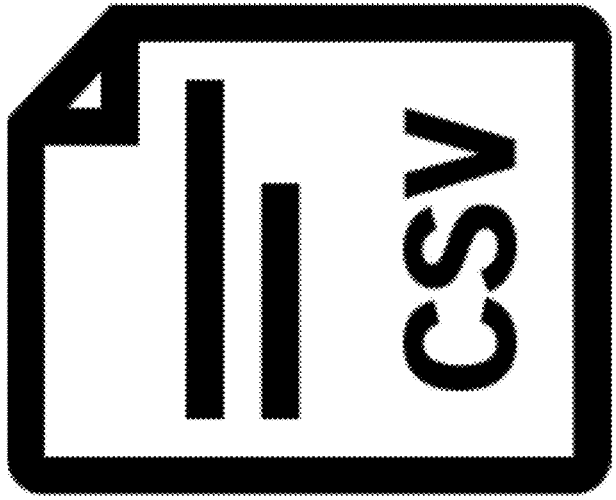
FIG. 12B shows an example of a sample CSV export or database output file corresponding to the legacy database of FIG. 12A.

As shown in FIG. 10B, the method can comprise exporting the legacy database at 1005. In particular, a user can export an existing or legacy database system at 1005 into a common database output file such as, for example, a CSV, XML, JSON, or any other database output file. The legacy database or database output file can comprise a plurality of cells, wherein each cell can contain or represent a value or data, or can be empty or have a "null" value. FIG. 12B shows an example of a sample CSV export or database output file corresponding to the legacy database of FIG. 12A. The legacy database or database output file can be imported at 1020 into a file asset management system or platform as described herein, or any other common platform for managing data and metadata such as for example, MetaFarm™. The database output file can be imported at 1020 via various means, for example, through a graphical user interface, and through various actions and communication methods, including but not limited to drag and drop, drop folder, programmatically, through e-mail or any other means of communicating or transmitting a file from one place to another. The file can be processed in an automated fashion and in particular, an automated data processing and extraction module can be configured to process the database output file, to automatically identify or recognize the type of database output file that has been imported, and to apply an appropriate process or algorithm to extract the data within the database output file at 1030.

In one embodiment, an automated data processing and extraction module can be configured to identify or recognize which part of the database output file contains or represents the categories, header, or other form of label for the rest of the data. For example, "name," "address," "phone number," can be identified or recognized to not be the data itself, but to be the proper category, header, or label of the data that follows. This is also shown in FIG. 12A, wherein the first row 1221 of the legacy database contains or represents the categories, header, or other form of label—in this case, "FileName," "Date," "Photographer," "Producer," "Tags," and "Notes."

A data comparison can be made at 1040 by looking into the data and determining or finding values or data at 1050 that matches (or is similar to) data already present in the file asset management system or platform, or any other common platform for managing data and metadata such as Meta-Farm™. Notably, the data comparison is not limited to a particular method, and can be made using any similarity metric or comparison algorithm as known in the art or yet to be developed.

As shown in FIG. 12A, a legacy database can have several rows and the first column can contain or represent filenames. The filenames in the legacy database can be extracted from the legacy database and a selected entry, which in this example is a selected filename, can be compared at 1040 to metadata entries that can correspond to a matching category, header, or label such as "FileName," selected from each of the previously harvested files or records in the file asset management system or platform. The previously harvested files can be existing records, and can reside or be stored in the system or platform, or can reside or be stored in a memory or storage device in another location.

After comparing data or metadata (in this case, filenames) extracted from the legacy database to data or metadata in each of a plurality of records in a file asset management system or platform at 1040, a determination can be made at 1050 as to whether a selected entry of the extracted data matches an entry in each of the plurality of records. Moreover, each record in the plurality of records can comprise a plurality of fields, and each field in the plurality of fields can have an associated value. The format of the data in each of the plurality of records can be different from the format of the data in the common database output file.

As shown in FIGS. 10A-10B, the results of the data comparison at 1040 and matching process at 1050 as described herein can be identified and output at 1060. The output can also be displayed either through a command prompt, API response, graphical user interface, or any other method of conveying information to a user. In particular, the output at 1060 can result or be generated from determining that a match between data extracted from the database output file and data from the existing records at 1055.

A suggestion can then be made at 1060 as to which column represents a match to the filename of an existing record or to some other primary key or match between a selected entry from the legacy database or database output file and an entry in the existing records. For example, in an imported CSV file, the extracted data in two or more rows from the "FileName" column of the legacy database can closely resemble, be similar to, or match exactly the "File-Name" field in existing records in the file asset management platform or system.

The user can be provided with an option to agree with the fields and data shown or suggested as matching data or metadata in existing records at 1065. The user can then agree to the suggestion of a match, in this case, that "FileName" is the primary key to match extracted data in the imported CSV file with data in the existing records.

Alternatively, the user can opt to edit which columns or fields are used to match the data by selecting a different column to represent the primary key in existing records at 1063. For instance, if more than one column's worth of data is found to match entries in existing records such as data for two or more rows in columns having column headers of "Photographer" and "Producer," and where the user disagrees with the suggested match presented at 1060, the user can pick a different column from the imported CSV file, such as "Producer" from the example above. Selecting this column will force the file asset management system or platform to use the user-selected column as the primary key to match against existing records in the platform. Once the user has selected a different column to represent the primary key for each record in the plurality of records at 1063, the imported values or data can be added to the plurality of records at 1073 and 1075, where the original column headers (e.g. the first row in the example shown in FIG. 12A), from the legacy database become the names of new fields in an existing record at 1073, and the rest of each of the rows fill in the values for the new fields to populate the newly created fields in the existing record. In this manner, the legacy database is consolidated with the plurality of records at 1070 by incorporating the extracted data into one of the plurality of records at 1073 and 1075.

As shown at 1043, in the case where no matching entries can be found in existing records for the selected entry of the extracted data from the legacy database, the user can choose to create a new record at 1043. The user can also opt to edit which columns or fields become the matching field at 1045. A new record can be created with primary record names being the selected primary column and the remaining column names being used to create new field names, with the data from each row populating the new fields. The new records can later be matched up with previously harvested files or existing records. In particular, the user can select the column, category, header, or label of metadata in the legacy database to become the key matching field for any new record that may be imported, processed, or harvested by the file asset management system or platform. For example, the user may select the 'filename' category in the original database field to be the name of the new records, so that when additional files having matching filenames are imported, processed, or harvested, the metadata is populated into the already existing record instead of creating a new parallel or redundant record having the same filename.

Figure 11:
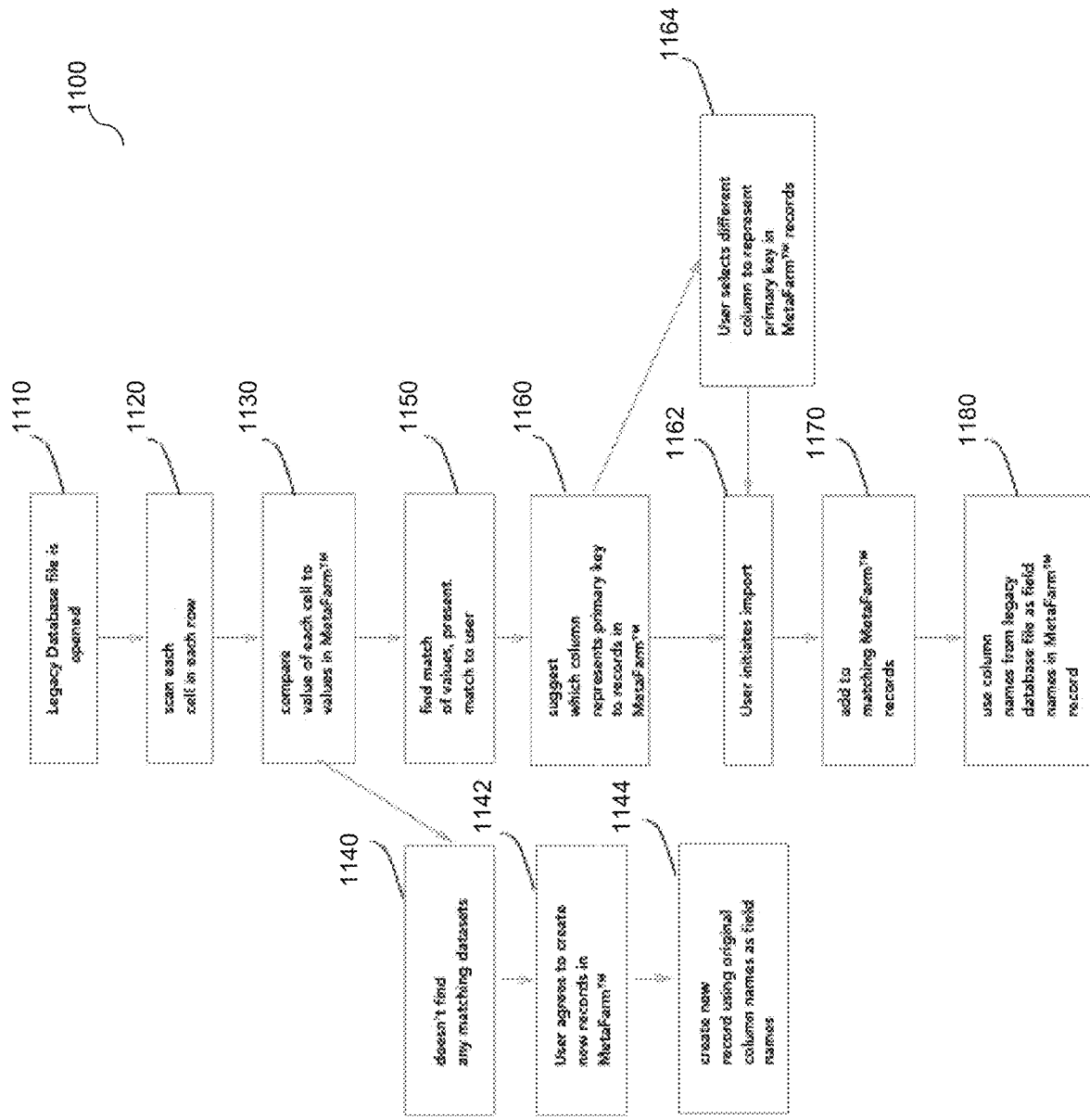
FIG. 11 is another flowchart showing a number of steps in an exemplary database consolidation method.

FIG. 11 shows additional details of an exemplary database consolidation method as described herein. A user can import a CSV file that is an export of a legacy database, which can be opened at 1110. The user can drag and drop, import, or otherwise send the CSV to the file asset management system or platform by any means available on a computer or mobile device.

At 1120, each cell in each row of the imported CSV file can be scanned, copied, written to memory, and/or otherwise recognized, wherein the names of the columns can noted and all data in every row can be processed. Data from each cell can be compared at 1130 to values or data in each record in a plurality of records in the file asset management system or platform. For example, text from every cell in the imported CSV file can be compared at 1130 to each value in each field of each existing record in the file asset management system or platform to look for a close similarity or a match. Moreover, the data in previously harvested files or in existing records can be formatted, organized, categorized, or stored in a completely different way from the format of the CSV file. Such differences in formatting can be recognized and managed by simply looking at the text content of every cell of the CSV file.

After data extracted from the legacy database is compared at 1130 to data from existing records in the file asset management system or platform by comparing the value of each cell in the legacy database or database output file to values in each record in plurality of records in the file asset management system or platform, a match between two or more values in the existing records to cell values in the imported CSV file is found and presented to the user at 1150. The results of the match can be presented through a graphical user interface, a web page, an application, a JSON response, or any other means by which information can be communicated. Finding a match of values between a selected entry of the extracted data and an entry in each of the plurality of records and identifying a set of matching entries to present to the user can comprise identifying text from each cell in the plurality of cells in the common database output file and comparing the identified text to each value in each field of each record in the file asset management system to find a match. In particular, if records are found that contain a match to the selected entry of the extracted data from the legacy database, for example, if records are found whose filename matches the filename of the extracted data from the legacy database, the details of that match are output at 1150.

A suggestion can then be made at 1160 as to which column represents a match to the filename of an existing record or to some other primary key or match between a selected entry from the legacy database or database output file and an entry in the existing records. For example, in an imported CSV file, the extracted data in two or more rows from the "FileName" column of the legacy database can closely resemble, be similar to, or match exactly the "FileName" field in existing records in the file asset management platform or system.

The user can be provided with an option to agree with the fields and data shown or suggested as matching data or metadata in existing records at 1160. The user can then agree to the suggestion of a match, in this case, that "FileName" is the primary key to match extracted data in the imported CSV file with data in the existing records. If the user chooses not to edit the fields and data suggested or shown at 1160, the user can, at 1162, initiate importing the values or data from the legacy database into the existing record identified as containing a match.

Alternatively, the user can opt to manually edit which columns or fields are used to match the data by selecting a different column to represent the primary key in existing records at 1164. For instance, if more than one column's worth of data is found to match entries in existing records such as data for two or more rows in columns having column headers of "Photographer" and "Producer," and where the user disagrees with the suggested match presented at 1150, the user can pick a different column from the imported CSV file, such as "Producer" from the example above. Selecting this column will force the file asset management system or platform to use the user-selected column as the primary key to match against existing records in the platform. Once the user has selected a different column to represent the primary key for each record in the plurality of records at 1164, the user can, at 1162, initiate importing the values or data from each cell in the legacy database or database output file into an existing record identified by the user-selected column.

The imported values or data can be added to the plurality of records at 1170, where the original column names, header, category, or label information from the legacy database can be used as the names of new fields in an existing record at 1180. Finally, the values or data contained or represented in the cells for each row, line, or other delineation of data in the legacy database or database output file can be used to populate the newly created fields in the existing record.

As shown at 1140, in the case where no match can be found to the selected entry of the extracted data from the legacy database in any of the existing records, the user can be given a choice to create new records at 1142 using the suggested column names as field names. Once the user agrees and initiates the import at 1162, a new record can be created with primary record names being the selected primary column and the remaining column names being used to create new field names, with the data from each row populating the new fields. The new records can later be matched up with previously harvested files or existing records. In particular, the user can select the column, category, header, or label of metadata in the legacy database to become the key matching field for any new record that may be imported, processed, or harvested by the file asset management system or platform. For example, the user may select the "filename" category in the original database field to be the name of the new records, so that when additional files having matching filenames are imported, processed, or harvested, the metadata is populated into the already existing record instead of creating a new parallel or redundant record having the same filename.

Figure 13:
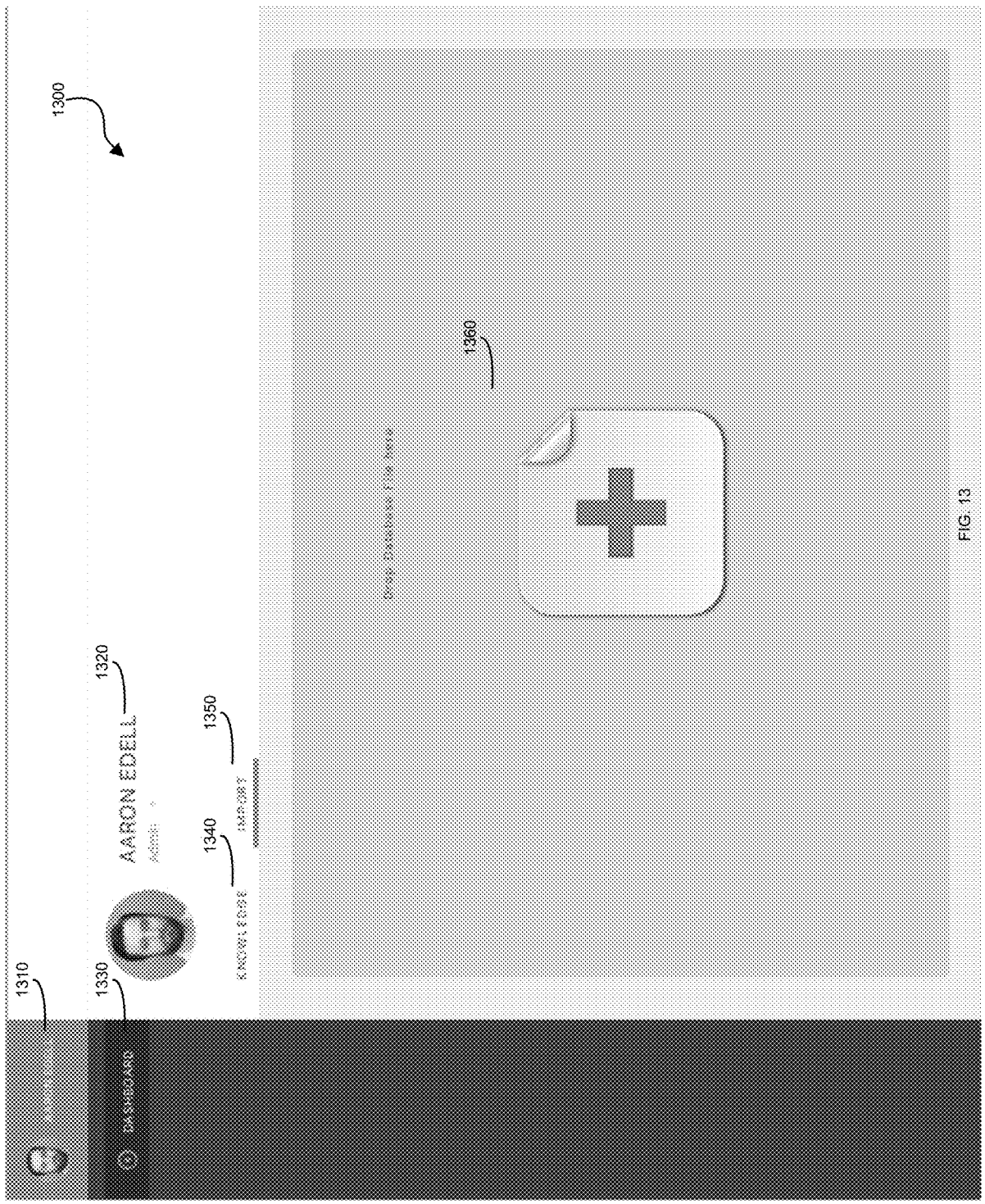
FIG. 13 shows an exemplary graphical interface for an embodiment of a database consolidation method.

FIG. 13 shows an exemplary graphical interface 1300 for an embodiment of a database consolidation method. In particular, a Home Page View 1300 is depicted in FIG. 13 that includes the display of a user and a user's role. A user or role can be identified by a symbol, icon, photo, text, or any other identification object 1310 and 1320. The object identifying the user and role displayed on the graphical interface can show which user is currently able to access the invention. The role indicated can reflect a user's permissions and access to features, including for example, which features of the graphical interface the user is allowed to access. The graphical interface can provide the ability to add, edit, or delete users, add, edit, or delete user profiles and other user-related information, and add, edit, or delete different roles, wherein each role may be defined to include access to certain features provided by the graphical interface. Information regarding users and roles may also be saved, stored, and tracked.

The graphical interface can include a dashboard 1330, or some other representation that enables a user to access certain important administrative functions within the file asset management system or platform. A "Knowledge" view, tab, or page 1340 provides a view to details of importing a database file such as a legacy database or other database. An "Import" view, tab, or page 1350 provides an interface for dragging or dropping a database file representation at a possible location 1360 on the display to be automatically processed by the file asset management system or platform.

Figure 14:
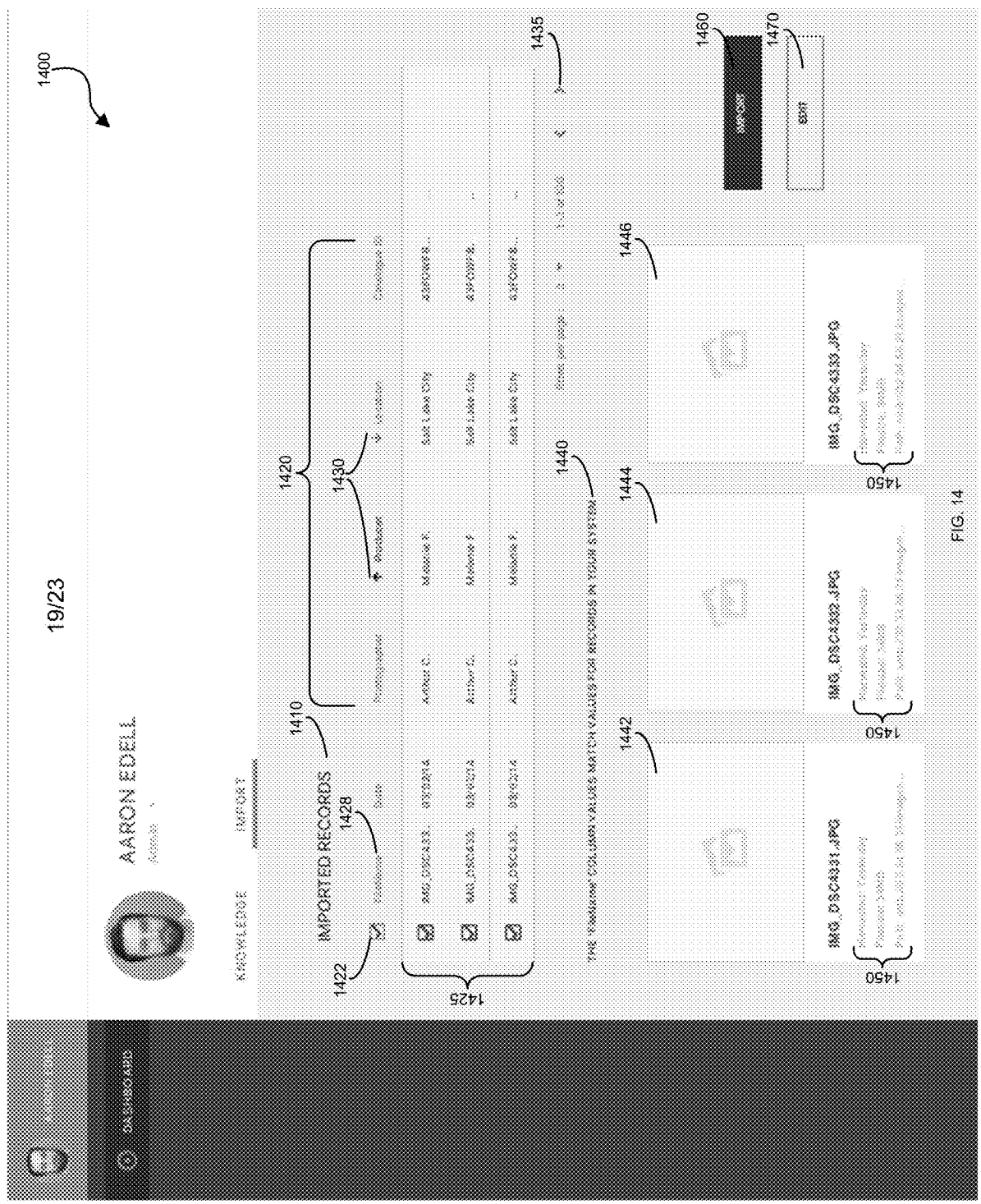
FIG. 14 shows a view of the graphical interface of FIG. 13 after a user interaction.

FIG. 14 shows an Import View 1400 of the graphical interface of FIG. 13 after a user interaction. More specifically, once a user drags and drops a database file or legacy database to a particular location on the interface as shown in FIG. 13, the database file or legacy database is automatically imported and processed resulting in the view of FIG. 14.

As shown in FIG. 14, a section header, Imported Records 1410, indicates a set of imported legacy records where a user can view data that has been parsed and extracted from the legacy database file. In one embodiment, the legacy database can be formatted as a table with columns indicating the name, header, label, or category of data, and rows representing a record with data in each cell. For example, a category of data 1420 may have the name, column header, label, or category of data such as "FileName," "Date," "Photographer," "Producer," "Location," and "Catalogue ID." Any one of these categories, headers, or labels can be chosen as a selected entry of the extracted data from the legacy database for purposes of seeking a match with data in existing records in the file asset management system or platform. The selection of "FileName" in this case is indicated by a checkmark in a box, 1422, next to the "FileName" label. Similarly, the identification or determination of a suggested match to "FileName" can be shown by an indicator such as a checkmark in a box 1425, wherein the entries next to the checked boxes represent all of the matching entries found within existing records in a plurality of records in or accessed by the file asset management system or platform environment. In some embodiments, only some of the imported legacy records in the legacy database file may be determined to have matches to existing records in the file asset management system or platform, in which case, the imported legacy records having no matches can be presented on the display with no checkmark. The imported legacy records having no match to the existing records can be used to create new records that can be added to the existing records in the file asset management system or platform.

A sorting selection object 1430 next to a name, header, label, or category can provide an ability to sort the list of imported legacy records found in the legacy database import file to make it easier to view the data in a particular order. In this particular example, the sorting selection object is implemented using an upward or downward pointing arrow icon 1430, but may be implemented in other ways, including use of different symbols, text, icons or some other indication or representation that allows a user to make a selection. Another selection object 1435, shown as arrow icons pointing to the left and right, can provide an ability to explore more data in the legacy database file as formatted in the graphical user interface. As with the sorting feature, the selection object 1435 that provides an ability to view more data can be implemented in other ways including but not limited to using different symbols, text, icons, scroll bars, or some other indication that more data can be viewed.

A Matching Result heading 1440 indicates a set of matching records was found. In this example, the matching records within the file asset management system or platform that have a field that matches the category or column selected at 1422, as well as the data or metadata associated with each matching record, are listed below the Matching Result heading 1440. Here, the selected entry of the extracted data from the imported legacy database is the category, header, or label of "FileName" 1428. FIG. 14 shows three matching records 1442, 1444, and 1446 in the file asset management system or platform that were determined to match extracted data under "FileName" from the imported legacy database file. In this example, filenames of the matching records "IMG_DSC4221.JPG," "IMG_DSC4221.JPG," and "IMG_DSC4221.JPG," and a corresponding or associated icon representing each matching record in the file asset management system or platform that were determined to match the filename data points or selected entry from the legacy database file are displayed or presented to the user under the Matching Result heading 1440. In this example, the matching records 1442, 1444, and 1446 are image files each having a thumbnail representation, the image files having been previously harvested, processed, and stored by the file asset management system and platform. The matching records are not limited to image files but can be any type of file as described herein and as known in the art. The representation of the image files is not limited to a thumbnail representation, but can include any other representation as known in the art. In addition to the thumbnail representation of the image file for the matching records, the graphical interface includes a display of other metadata 1450 associated with each matching record. As shown in FIG. 14, other data or metadata associated and displayed for each matching record can include for example, when the matching record was harvested, the file size of the matching record, and an associated path for the matching record. This feature can be configured to display any selection of data or metadata associated with a matching record.

An Import selection object 1460 can be provided to enable a user to initiate or trigger the process of combining, reconciling, and/or consolidating the data from the imported legacy database file with existing records in the file asset management system or platform as described herein. In this particular example, the Import selection object 1460 is implemented using a rectangular button having the text "IMPORT," but may be implemented in other ways, including use of different symbols, text, icons or some other indication or representation that allows a user to make a selection. This process can be initiated by a user, for example, according to the method depicted in FIG. 11 at 1142. Selecting the Import selection object 1460 can lead to another view of the graphical interface as shown in FIG. 15.

An Edit selection object 1470 can be provided to enable a user to manually edit which columns or fields are used to match the data by selecting a different column to represent the primary key in existing records at 1164 opt to edit which columns or fields become the matching field at 1045. In this particular example, the Edit selection object 1470 is implemented using a rectangular button having the text "EDIT" but may be implemented in other ways, including use of different symbols, text, icons or some other indication or representation that allows a user to make a selection. A new record can be created with primary record names being the selected primary column and the remaining column names being used to create new field names, with the data from each row populating the new fields.

Figure 15:
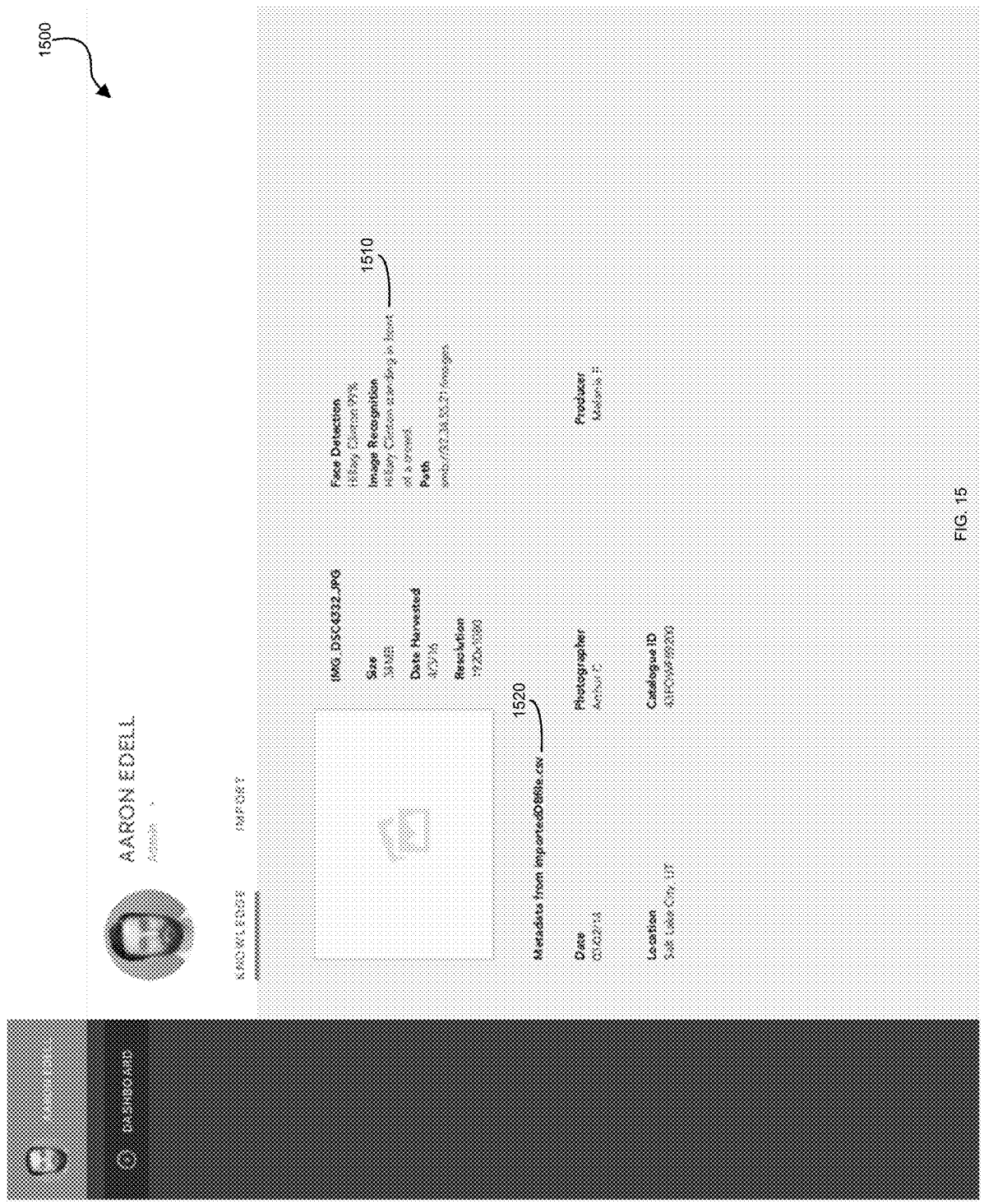
FIG. 15 shows a view of the graphical interface of FIG. 13 accessed via the view of FIG. 14.

FIG. 15 shows a view of the graphical interface of FIG. 13 accessed via the view of FIG. 14. Specifically, the Knowledge View 1500 as shown in FIG. 15 can be accessed as described herein by selecting the Import selection object 1460, which initiates or triggers the system or platform to import and consolidate the imported database, legacy database, or database output file with the existing records accessed by the file asset management system and platform.

Accordingly, the Knowledge View 1500 as depicted in FIG. 15 shows the result of displaying an updated existing record after a legacy database file has been successfully imported and consolidated with the existing record in or accessed by the file asset management system and platform. FIG. 15 depicts a sample existing record that has been supplemented with data added from the imported legacy database. Previously harvested metadata in the existing record can be displayed in a separate location from the newly added data extracted from the imported legacy database. In FIG. 15, the previously harvested metadata represents the metadata that already existed for this record, generated by a separate process within the file asset management system and platform as described herein and in co-pending U.S. Patent Application No. 62/281,711 and U.S. Patent Application No. 62/313,498, the entire contents of which are incorporated herein by reference. The previously harvested metadata 1510 is displayed in a separate location from the newly imported data 1520 that was imported from the legacy database, parsed, and added to this existing record. New field names such as "Date", "Photographer" and "Producer" have been created in this case and populated with the data from the corresponding row and columns in the originating imported legacy database file.

Figure 16:
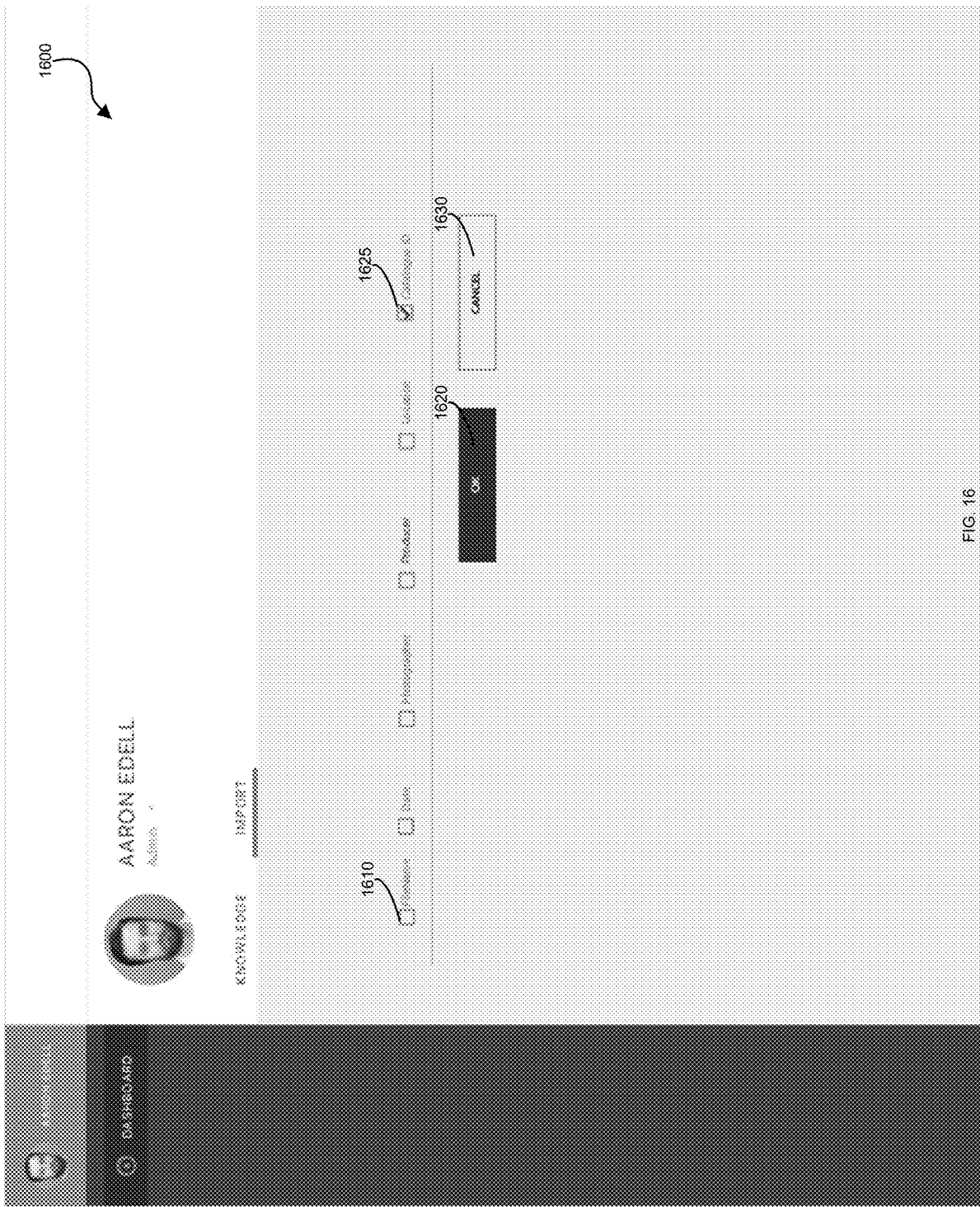
FIG. 16 shows another view of the graphical interface of FIG. 13 accessed via the view of FIG. 14.

FIG. 16 shows another view of the graphical interface of FIG. 13 accessed via the view of FIG. 14. Specifically, the Import/Edit View 1600 as shown in FIG. 16 can be accessed by selecting the Edit selection object 1470.

Accordingly, the Import/Edit view 1600 as depicted in FIG. 16 shows the result after a user has, by selecting the Edit selection object 1470, opted to edit the column name, category, header, label, or field name to represent the key matching record for new or existing records in the file asset management system or platform. As shown in FIG. 16, the different column names, categories, headers, labels, or field names (e.g. "FileName", "Date", "Photographer", "Producer", "Location", and "Catalogue ID") can be displayed, each having an associated selection object 1620 to allow the user to select one of the categories. In this example, the selection object 1610 is an empty box that may be checked by the user, but other selection objects may be used including different symbols, text, icons or some other indication or representation that allows a user to make a selection. An indication of the selected category can be displayed by a checked box 1625. In this example, the checked box next to the category "Catalogue ID" indicates a choice to select the "Catalogue ID" as the matching field, which means that for every row or delineation of records where there is a value for the category Catalogue ID, that value will be used to determine a match with data in existing records in the file asset management system and platform where there exists a "Catalogue ID" to same (or similar) data relationship, as determined for example by a matching algorithm or use of a similarity metric as known in the art. Alternately, the user may opt to create or generate a new record using the Catalogue ID field name and can put the imported data from the legacy database or database output file into the Catalogue ID field, just as it was contained under that category, header, or label in the original legacy database. The rest of the data for each row is placed into fields under the newly created or an existing record based on the Catalogue ID, where the field names are the column or header names from the original legacy database or database output file, and the data within those fields are the data in each cell for each row.

A selection object 1620 provides the ability to submit the changes a user has made to the matching field and would lead the user back to the Import View 1400 in FIG. 14. In this example, the selection object 1620 is implemented using a rectangular button having the text "OK" but may be implemented in other ways, including use of different symbols, text, icons or some other indication or representation that allows a user to make a selection.

Another selection object 1630 provides the ability to cancel the editing process, bringing the use back to the Home Page View 1300 of the graphical interface. In this example, the selection object 1630 is implemented using a rectangular button having the text "CANCEL" but may be implemented in other ways, including use of different symbols, text, icons or some other indication or representation that allows a user to make a selection.

Although the examples herein describe the use of a CSV file as depicted in FIG. 12B, other database export files can be used as known in the art. For example, a database export file can be an XML file. An example legacy database can have the following four columns; FileName, HouseID, Photographer, License, with 500 rows of data. When exported as an XML, the XML file would be formatted where as such: <row>1</row><FileName>DSC_1234.jpg</FileName><HouseID>T 36435</HouseID><Photographer>Aaron E.</Photographer><License>Perpetual</License>

The file asset management system and platform as described herein is not limited by a particular format for the database export file and can identify, recognize, and process a format such as the above, as well as other formats as known in the art or yet to be developed.

Computer Control Systems

Figure 17:
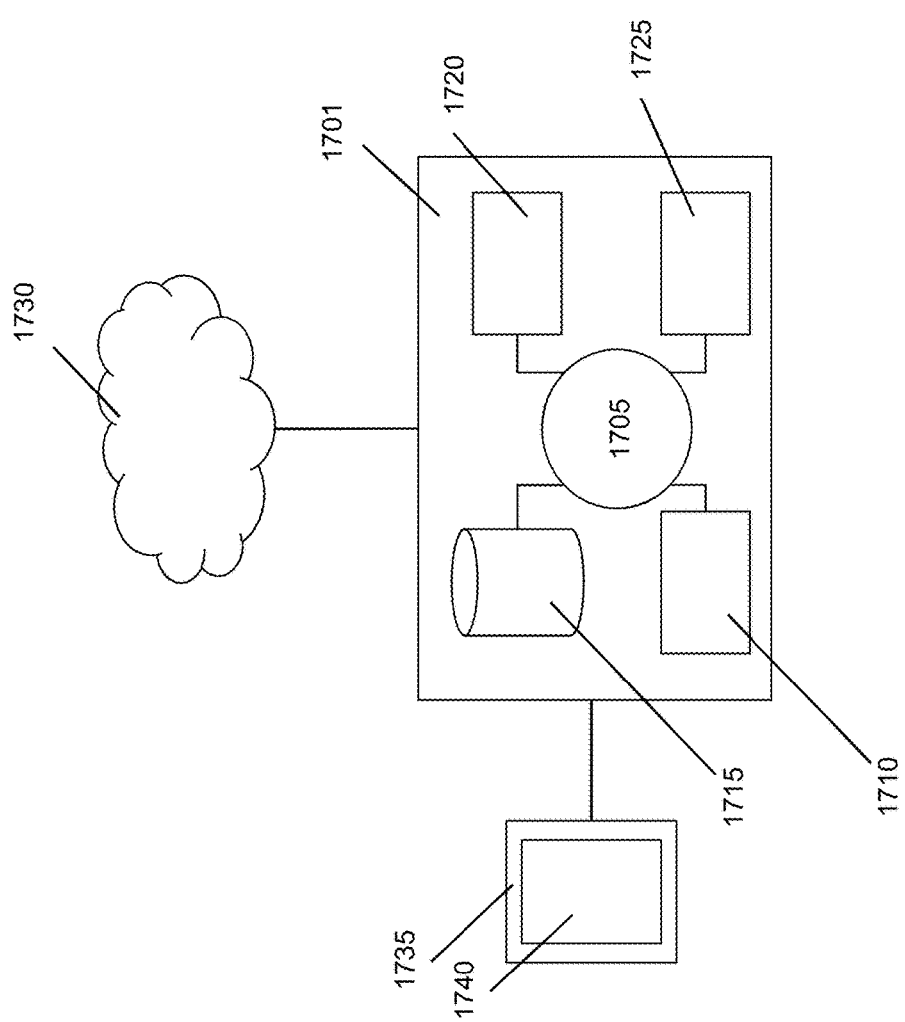
FIG. 17 shows a computer system that is programmed or otherwise configured to consolidate disparate databases.

The present disclosure provides computer control systems that are programmed to implement methods of the disclosure. FIG. 17 shows a computer system 1701 that is programmed or otherwise configured to consolidate disparate databases by executing instructions that perform the methods as described herein. The computer system 1701 can be a file asset management system that can comprise various software modules or automated agents to perform one or more steps of the methods described herein, including but not limited to: a comparison software module or automated agent for comparing data extracted from a first database to data in each of a plurality of records; a matching software module or automated agent for determining whether a selected entry of the extracted data matches an entry in each of the plurality of records; a recommendation software module or automated agent for identifying a set of entries in the plurality of records determined to match the selected entry of the extracted data; and a consolidation software module or automated agent for consolidating the first database with the plurality of records by incorporating the extracted data in one of the plurality of records or in a newly generated record.

The computer system 1701 can be an electronic device of a user or a computer system that is remotely located with respect to the electronic device. The electronic device can be a mobile electronic device.

The computer system 1701 can include a central processing unit (CPU, also "processor" and "computer processor" herein) 1705, which can be a single core or multi core processor, or a plurality of processors for parallel processing. The computer system 1701 can also include memory or memory location 1710 (e.g., random-access memory, read-only memory, flash memory), electronic storage unit 1715 (e.g., hard disk), communication interface 1720 (e.g., network adapter) for communicating with one or more other systems, and peripheral devices 1725, such as cache, other memory, data storage and/or electronic display adapters. The memory 1710, storage unit 1715, interface 1720 and peripheral devices 1725 are in communication with the CPU 1705 through a communication bus (solid lines), such as a motherboard. The storage unit 1715 can be a data storage unit (or data repository) for storing data. The computer system 1701 can be operatively coupled to a computer network ("network") 1730 with the aid of the communication interface 1720. The network 1730 can be the Internet, an internet and/or extranet, or an intranet and/or extranet that is in communication with the Internet. The network 1730 in some cases is a telecommunication and/or data network. The network 1730 can include one or more computer servers, which can enable distributed computing, such as cloud computing. The network 1730, in some cases with the aid of the computer system 1701, can implement a peer-to-peer network, which may enable devices coupled to the computer system 1701 to behave as a client or a server.

The CPU 1705 can execute a sequence of machine-readable instructions, which can be embodied in a program or software. The instructions may be stored in a memory location, such as the memory 1710. The instructions can be directed to the CPU 1705, which can subsequently program or otherwise configure the CPU 1705 to implement methods of the present disclosure. Examples of operations performed by the CPU 1705 can include fetch, decode, execute, and writeback.

The CPU 1705 can be part of a circuit, such as an integrated circuit. One or more other components of the system 1701 can be included in the circuit. In some cases, the circuit is an application specific integrated circuit (ASIC).

The storage unit 1715 can store files, such as drivers, libraries and saved programs. The storage unit 1715 can store user data, e.g., user preferences and user programs. The computer system 1701 in some cases can include one or more additional data storage units that are external to the computer system 1701, such as located on a remote server that is in communication with the computer system 1701 through an intranet or the Internet.

The computer system 1701 can communicate with one or more remote computer systems through the network 1730. For instance, the computer system 1701 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1701 via the network 1730.

Methods as described herein can be implemented by way of machine (e.g., computer processor) executable code stored on an electronic storage location of the computer system 1701, such as, for example, on the memory 1710 or electronic storage unit 1715. The machine executable or machine readable code can be provided in the form of software. During use, the code can be executed by the processor 1705. In some cases, the code can be retrieved from the storage unit 1715 and stored on the memory 1710 for ready access by the processor 1705. In some situations, the electronic storage unit 1715 can be precluded, and machine-executable instructions are stored on memory 1710.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1701 can include or be in communication with an electronic display 1735 that comprises a user interface (UI) 1740 for providing various features to enable a user to interact with the computer system. Examples of UI's include, without limitation, a graphical user interface (GUI) and web-based user interface. A preferable embodiment of a graphical user interface is described herein in FIGS. 13-16.

Methods and systems of the present disclosure can be implemented by way of one or more algorithms. An algorithm can be implemented by way of software upon execution by the central processing unit 1105. The algorithm can, for example, be employed to determine whether a selected entry of the extracted data matches, resembles, or is similar to an entry in each of the plurality of records. Various similarity metrics as known in the art or yet to be developed may be employed by the algorithm, and various thresholds may be set with respect to determining whether two entries are sufficiently similar or close enough to constitute a match.

Figure 18:
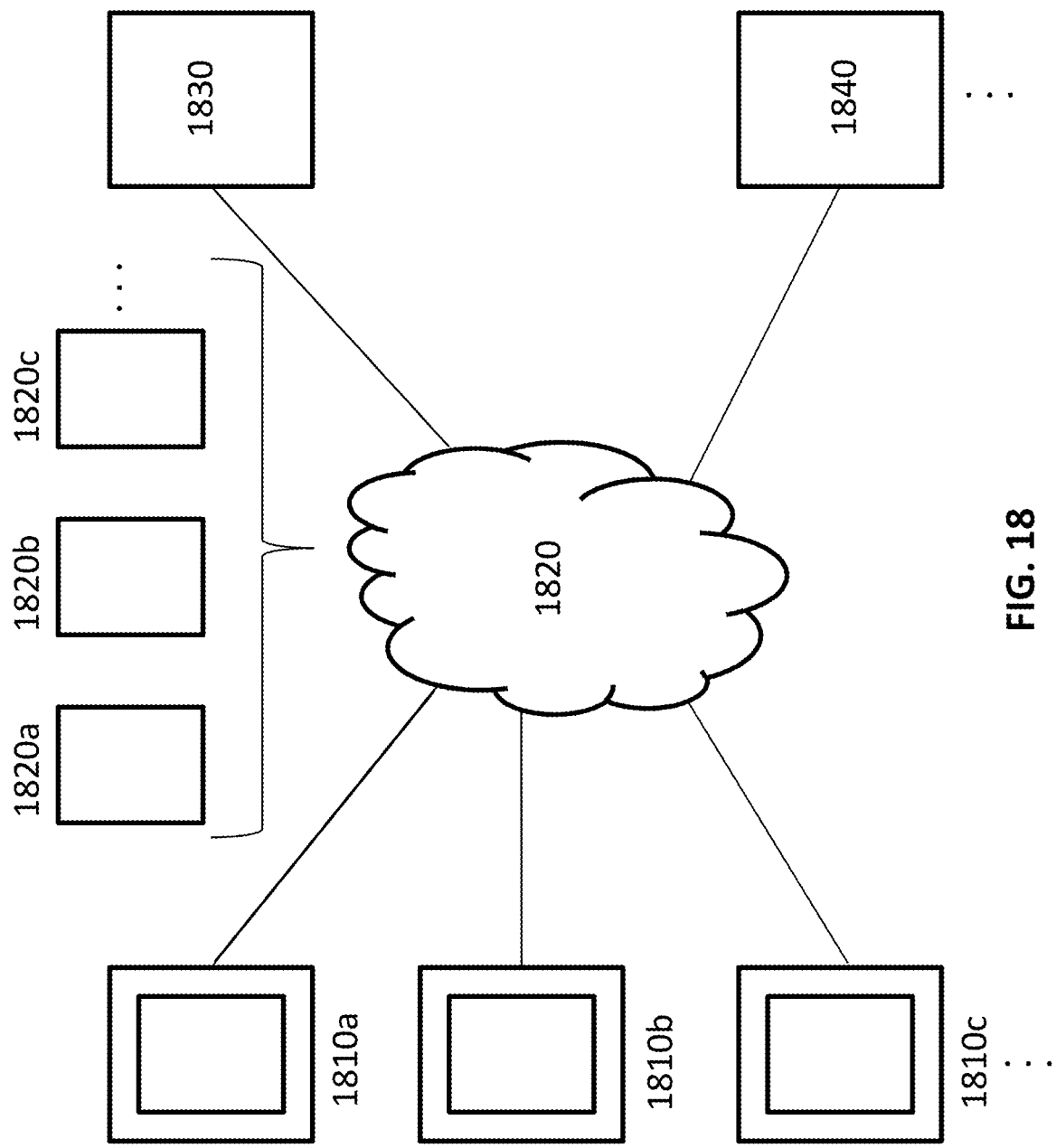
FIG. 18 shows an example of a network-enabled system for consolidating disparate repositories.

FIG. 18 shows an example of a network-enabled system for consolidating disparate repositories. In some embodiments, the system may comprise one or more devices 1810a, 1810b, 1810c forming a network of devices. Devices may be capable of communicating of a network 1820. The network may optionally comprise one or more nodes 1820a, 1820b, 1820c. A media asset management system 1830 may be provided. Optionally, one or more repositories 1840 may be provided.

One or more devices 1810a, 1810b, 1810c may be provided as part of the system. The system may form a network of devices. The devices may be capable of communicating with one another, with a network, or with one or more data repositories or management systems. The devices may have any characteristics or features as described elsewhere herein. The devices may be desktop computers, servers, laptops, tablets, mobile devices (e.g., smartphones, personal digital assistants, pagers, etc.), wearable devices (e.g., smartwatches, glasses, etc.) or any other type of device. The devices may comprise one or more processors, an operating system configured to perform executable instructions, one or more memory units, and/or a computer program including instructions executable by the device. The memory may comprise non-transitory computer readable media that may comprise code, logic, or instructions for performing one or more steps.

In some embodiments, one or more devices may individually or collectively comprise a communication module and/or translation module. A communication module may receive and/or send communications. For instance, a communication module may receive a communication comprising data that may be extracted from a repository. A translation module may perform data comparisons and/or translations. In some instances, a translation module may transform, translate, and/or consolidate a repository. Any modules may comprise one or more software or hardware modules that may be provided on a single device or distributed over multiple devices. Any module may comprise non-transitory computer readable media with computer executable instructions for performing any steps. In some instances, the module may comprise field-programmable gate arrays or other integrated circuits.

A device may comprise a media player capable of playing back media. The media player may be stored in a memory of the device. A media player may be capable of accessing any type of content or data. The media player may be capable of presenting the content or data to a user of the device. In some instances, a display may be provided on a device, comprising a graphical user interface that may show information relating to the media (e.g., content or data).

Devices may be capable of communicating over a network 1820. Any type of network, such as those described elsewhere herein, may be used. In some embodiments, a network may comprise one or more nodes 1820a, 1820b, 1820c that may aid in the transmission of data. The nodes may be telecommunication nodes capable of receiving and/or transmitting data. The nodes may comprise one or more devices, as described herein. In some instances, devices provided herein may function as nodes of a network.

A media asset management system 1830 may be provided. Any description herein of a media asset management system may apply to a file asset management system and vice versa. The media asset management system may communicate with one or more devices directly or over a network. The media asset management system may or may not be in direct communication with one or more nodes. The media asset management system may be provided as a common platform. The media asset management system may comprise a plurality of records. The records may be media records. The records may comprise metadata.

One or more repositories 1840 may be provided. Any description herein of a repository may apply to a database and vice versa. The repository may communicate with one or more devices directly or over a network. The repository may communicate with a media asset management system directly or over a network. The repository may or may not be in direct communication with one or more nodes. The repository may comprise a plurality of records. Data may be extracted from the repository. In some instances, the extracted data may comprise metadata. The extracted data may comprise media. A repository may comprise one or more media records. A repository may comprise media players or data to be played back by media players.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A network-enabled method for consolidating disparate repositories onto a common media asset management platform, comprising:
   a. receiving a communication comprising data extracted from a first repository of media players on a network of devices for comparison to data in each of a plurality of records in the media asset management platform, wherein the extracted data from the first repository comprises labels and values associated with the labels;
   b. determining whether a selected label of the extracted data matches a pre-existing label in each of the plurality of records;
   c. identifying a set of pre-existing labels in the plurality of records determined to match the selected label of the extracted data;
   d. in response to the identification of the set of matching pre-existing labels in the plurality of records, providing an option to select one of the pre-existing labels in one of the plurality of records or to select a different pre-existing label in one of the plurality of records, wherein the different pre-existing label was not determined to match the selected label of the extracted data; and e. translating the first repository with the plurality of records by incorporating the extracted data in one of the plurality of records or in a newly generated record to be stored in the media asset management platform and accessible for playback on the media player on a device from the network of devices.

2. The method of claim 1, further comprising providing a graphical interface for displaying the extracted data, the results of the data comparison, and the identified set of matching pre-existing labels.

3. The method of claim 1, further comprising:
a. providing the first repository as a common repository output file, wherein the first repository is a legacy repository;
b. importing the legacy repository into the media asset management platform; and
c. extracting data from the common repository output file for comparison to data in each of the plurality of records.

4. The method of claim 3, wherein providing a legacy repository further comprises exporting the legacy repository as a common repository output file comprising a plurality of cells, wherein each record in the plurality of records comprises a plurality of fields, and wherein each field in the plurality of fields has an associated value.

5. The method of claim 3, wherein the format of the data in each of the plurality of records is different from the format of the data in the common repository output file and wherein identifying the set of matching entries comprises identifying text from each cell in the plurality of cells in the common repository output file and comparing the identified text to each value in each field of each record in the media asset management system to find a match.

6. The method of claim 1, wherein consolidating the first repository with the plurality of records is in response to at least one of: determining whether a selected label of the extracted data matches a pre-existing label in each of the plurality of records and identifying a set of pre-existing labels in the plurality of records determined to match the selected label of the extracted data.

7. The method of claim 1, further comprising, in response to a selection of a pre-existing label, consolidating the first repository with the plurality of records by incorporating the extracted data into one of the plurality of records.

8. The method of claim 1, further comprising providing a graphical interface for selecting one of the pre-existing labels in one of the plurality of records or a different pre-existing label in one of the plurality of records and for displaying the results of the selection.

9. A network-enabled system for consolidating disparate repositories onto a common media asset management platform, comprising:
a memory for storing a set of software instructions, and one or more processors configured to execute the set of software instructions to:
a. receive a communication comprising data extracted from a first repository of media players on a network of devices for comparison to data in each of a plurality of records in the media asset management platform, wherein the extracted data from the first repository comprises labels and values associated with the labels;
b. determine whether a selected label of the extracted data matches a pre-existing label in the plurality of records;
c. identify a set of pre-existing labels in the plurality of records determined to match the selected label of the extracted data;
d. in response to the identification of the set of matching pre-existing labels in the plurality of records, provide an option to select one of the pre-existing labels in one of the plurality of records or to select a different pre-existing label in one of the plurality of records, wherein the different pre-existing label was not determined to match the selected label of the extracted data; and
e. translate the first repository with the plurality of records by incorporating the extracted data in one of the plurality of records or in a newly generated record to be stored in the media asset management platform and accessible for playback on the media player on a device from the network of devices.

10. The system of claim 9, further comprising a graphical interface for displaying the extracted data, the results of the data comparison, and the identified set of matching pre-existing labels.

11. The system of claim 9, further comprising an extraction module for wherein the one or more processors are configured to execute the set of software instructions to further:
a. import the first repository, wherein the first repository is a legacy repository that has been exported as a common repository output file; and
b. extract data from the common repository output file for comparison to data in each of the plurality of records.

12. The system of claim 11, wherein the common repository output file comprises a plurality of cells, wherein each record in the plurality of records comprises a plurality of fields, and wherein each field in the plurality of fields has an associated value.

13. The system of claim 11, wherein the format of the data in each of the plurality of records is different from the format of the data in the common repository output file, and wherein the instructions for identifying the set of matching entries comprise instructions for identifying text from each cell in the plurality of cells in the common repository output file and instructions for comparing the identified text to each value in each field of each record in the media asset management system to find a match.

14. The system of claim 9, wherein the translation of the first repository with the plurality of records comprises at least one of: determining whether a selected label of the extracted data matches a pre-existing label in the plurality of records and identifying a set of pre-existing labels in the plurality of records determined to match the selected label of the extracted data.

15. The system of claim 9, wherein the one or more processors are configured to execute the set of software instructions to further match a selected label of the extracted data with a pre-existing label in one of the plurality of records, wherein the extracted data from the first repository comprises labels and values associated with the labels.

16. The system of claim 15, wherein the one or more processors are configured to execute the set of software instructions to further provides an option to select a pre-existing label residing in at least one of the plurality of records, the pre-existing label having been determined to match the selected label of the extracted data or to select a different pre-existing label in one of the plurality of records, wherein the different pre-existing label was not determined to match the selected label of the extracted data.

17. A network-enabled method for consolidating disparate repositories onto a common media asset management platform for managing metadata, comprising:
   (a) importing a first set of metadata from a first repository to the media asset management platform, wherein the first set of metadata is harvested from media data of one or more media players on a network of devices;
   (b) extracting one or more imported labels of the first set of metadata and comparing the one or more imported labels with one or more pre-existing labels in a plurality of records of metadata in the media asset management platform to determine a match;
   (c) upon determining one or more of the imported labels matches one or more pre-existing labels, selecting one imported label from the one or more matched imported labels based on said comparison;
   (d) determining whether a value of a pre-existing label that matches the selected imported label in the plurality of records of the metadata matches the value of the selected imported label of the first set of metadata; and
   (e) translating the first set of metadata into the plurality of records by incorporating the first set of metadata in one of the plurality of records with a matched pre-existing label and a matched value, or incorporating the first set of metadata in a newly generated record to be stored in the media asset management platform when no matched pre-existing label is determined.

18. A network-enabled system for consolidating disparate repositories onto a common media asset management platform, comprising:
   a memory for storing a set of software instructions, and one or more processors configured to execute the set of software instructions to:
   (a) import a first set of metadata from a first repository to the media asset management platform, wherein the first set of metadata is harvested from media data of one or more media players on a network of devices;
   (b) extract one or more imported labels of the first set of metadata and comparing the one or more imported labels with one or more pre-existing labels in a plurality of records of metadata in the media asset management platform to determine a match;
   (c) upon determining one or more of the imported labels matches one or more pre-existing labels, select one imported label from the one or more matched imported labels based on said comparison;
   (d) determine whether a value of a pre-existing label that matches the selected imported label in the plurality of records of the metadata matches the value of the selected imported label of the first set of metadata; and
   (e) translate the first set of metadata into the plurality of records by incorporating the first set of metadata in one of the plurality of records with a matched pre-existing label and a matched value, or incorporating the first set of metadata in a newly generated record to be stored in the media asset management platform when no matched pre-existing label is determined.

* * * * *